(12) United States Patent
Cui et al.

(10) Patent No.: US 9,973,983 B2
(45) Date of Patent: *May 15, 2018

(54) COMMUNICATION MANAGEMENT APPARATUS AND COMMUNICATION MANAGEMENT METHOD

(71) Applicant: Sony Corporation, Minato-ku (JP)

(72) Inventors: Qimei Cui, Beijing (CN); Weijuan Gao, Beijing (CN); Qinyan Jiang, Beijing (CN); Tong Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/234,651

(22) Filed: Aug. 11, 2016

(65) Prior Publication Data

US 2016/0353339 A1    Dec. 1, 2016

Related U.S. Application Data

(63) Continuation of application No. 14/721,261, filed on May 26, 2015, now Pat. No. 9,445,331.

(30) Foreign Application Priority Data

Jun. 5, 2014 (CN) .......................... 2014 1 0247242

(51) Int. Cl.
| | | |
|---|---|---|
| H04W 36/00 | (2009.01) | |
| H04W 36/32 | (2009.01) | |
| H04W 4/02 | (2018.01) | |
| H04L 5/00 | (2006.01) | |
| H04W 36/16 | (2009.01) | |
| H04W 36/20 | (2009.01) | |
| H04W 24/02 | (2009.01) | |
| H04B 17/318 | (2015.01) | |
| H04W 36/04 | (2009.01) | |
| H04W 36/30 | (2009.01) | |
| H04W 88/02 | (2009.01) | |

(52) U.S. Cl.
CPC ...... *H04W 36/0061* (2013.01); *H04B 17/318* (2015.01); *H04L 5/0035* (2013.01); *H04L 5/0048* (2013.01); *H04L 5/0073* (2013.01); *H04W 4/02* (2013.01); *H04W 24/02* (2013.01); *H04W 36/0088* (2013.01); *H04W 36/04* (2013.01); *H04W 36/165* (2013.01); *H04W 36/20* (2013.01); *H04W 36/30* (2013.01); *H04W 36/32* (2013.01); *H04W 36/0083* (2013.01); *H04W 88/02* (2013.01)

(58) Field of Classification Search
None
See application file for complete search history.

(56) References Cited

U.S. PATENT DOCUMENTS 8,880,076 B2 * 11/2014 Toda ..................... H04W 36/30
                                                      370/252
8,886,190 B2 * 11/2014 Damnjanovic ....... H04L 5/0073
                                                      370/329

* cited by examiner

*Primary Examiner* — Adolf DSouza
(74) *Attorney, Agent, or Firm* — Oblon, McClelland, Maier & Neustadt, L.L.P.

(57) ABSTRACT

The communication management apparatus includes a reception index determination device configured to determine, with respect to respective neighboring cells of a serving cell of each terminal apparatus within a predetermined cell, and a reference signal reception index for the terminal apparatus according to location information of the terminal apparatus. The reference signal reception index is used for indicating signal reception situation of the terminal apparatus with respect to the neighboring cells.

20 Claims, 9 Drawing Sheets

COMMUNICATION MANAGEMENT APPARATUS AND COMMUNICATION MANAGEMENT METHOD

INCORPORATION BY REFERENCE

This application is a continuation of U.S. application Ser. No. 14/721,261, filed on May 26, 2015, which claims the benefit of Chinese Application No. 201410247242.0, filed on Jun. 5, 2014. The disclosures of the applications referenced above are incorporated herein by reference in their entireties.

FIELD OF THE INVENTION

The present disclosure generally relates to a wireless communication field, in particular to a communication management apparatus and a communication management method for managing cell switching.

BACKGROUND OF THE INVENTION

With the development of wireless communication technology, various smart terminals are broadly employed, resulting in an explosive increase of data demand. When facing to this tremendous challenge, in view that wireless data traffic is not performed in balance, a dense deployment of a low power cell will be the most effective means for dealing with the future increase of the wireless data traffic. However, with the increase of the density of the cell deployment, some problems appear. For example, a frequent switching of cell may reduce performance of a system to some extent, and interference between cells with the same frequency may severely affect performance of an edge user, and the like. At present, a cell switching technique is typically utilized to solve the above problems. However, since a transition time of a switching state conversion is long, it is difficult for the cell switching to achieve a performance improvement, and even in some cases, the performance may be degraded. Therefore, there is a need for a communication management apparatus and a communication management method for improve a cell switching performance.

SUMMARY OF THE INVENTION

A brief summary of the present disclosure is given below, so as to provide a basic understanding on some aspects of the present disclosure. It will be appreciated that the summary is not an exhaustive description of the present disclosure. It is not intended to define a key or important part of the present disclosure, nor is it intended to limit the scope of the present disclosure. It aims to give some concepts in a simplified form, as a preface to the more detailed description described later.

In view of above drawbacks of the prior art, one of the objects of the present disclosure is to provide a communication management apparatus and a communication management method, to overcome at least the problems existing in the prior art.

According to one embodiment of the present disclosure, there is provided a communication management apparatus including a reception index determination device configured to determine, with respect to respective neighboring cells of a serving cell of each terminal apparatus within a predetermined cell, a reference signal reception index for the terminal apparatus according to location information of the terminal apparatus, the reference signal reception index being used for indicating signal reception situation of the terminal apparatus with respect to the neighboring cells.

According to another embodiment of the present disclosure, there is provided a communication management method including: determining, with respect to respective neighboring cells of a serving cell of each terminal apparatus within a predetermined cell, a reference signal reception index for the terminal apparatus according to location information of the terminal apparatus, the reference signal reception index being used for indicating signal reception situation of the terminal apparatus with respect to the neighboring cells; and performing a decision of switching of the predetermined cell according to the reference signal reception index of the terminal apparatus, and when a switching state conversion is to be performed in the predetermined cell, selecting a target serving cell for the terminal apparatus within the predetermined cell and/or configuring a Channel State Indication Reference Signal (CSI-RS) and an Interference Measure Resource (IMR) for the predetermined cell and the neighboring cells thereof.

According to yet another embodiment of the present disclosure, there is provided a non-transitory computer readable storage device having instructions stored therein that when executed by processing circuitry perform a communication management method, the method comprising: determining, with respect to respective neighboring cells of a serving cell of each terminal apparatus within a predetermined cell, a reference signal reception index for the terminal apparatus according to location information of the terminal apparatus, the reference signal reception index being used for indicating signal reception situation of the terminal apparatus with respect to the neighboring cells; and performing a decision of switching of the predetermined cell according to the reference signal reception index of the terminal apparatus, and when the switching state conversion is to be performed in the predetermined cell, selecting a target serving cell for the terminal apparatus within the predetermined cell and/or configuring a Channel State Indication Reference Signal (CSI-RS) and an Interference Measure Resource (IMR) for the predetermined cell and the neighboring cells thereof.

Additionally, an embodiment of the present disclosure provides a computer program for implementing the above mentioned communication management method.

Furthermore, an embodiment of the present disclosure provides a corresponding computer-readable storage medium on which the computer program code for implementing the above mentioned communication management method is stored.

The communication management apparatus and the communication management method according to the embodiments of the present disclosure as described above can realize at least one of the following beneficial effects: being capable of obtaining a reference signal reception index in advance before a switching state of a cell is converted, thereby to improve cell switching performance; reducing a search time when a cell switching conversion is performed; reducing complexity of a conventional decision scheme of cell switching; and being capable of changing a cooperation requirement and a measurement set of a cooperation terminal apparatus and corresponding CSI-RS and IMR configurations in real time.

Through the following detailed description of the best embodiment of the present disclosure in conjunction with the accompanying drawings, these and other advantages of the present disclosure will become more apparent.

BRIEF DESCRIPTION OF THE DRAWINGS

The present disclosure may be understood better by referring to description provided below in conjunction with the accompanying drawings, wherein the same or similar reference signs are used to indicate the same or similar components in all figures. The figures and the following detailed description are included in the specification and form a part of the specification, and used to further explain preferred embodiments of the present disclosure and explain the principles and advantages of the present disclosure by examples. In the drawings.

Figure 1:
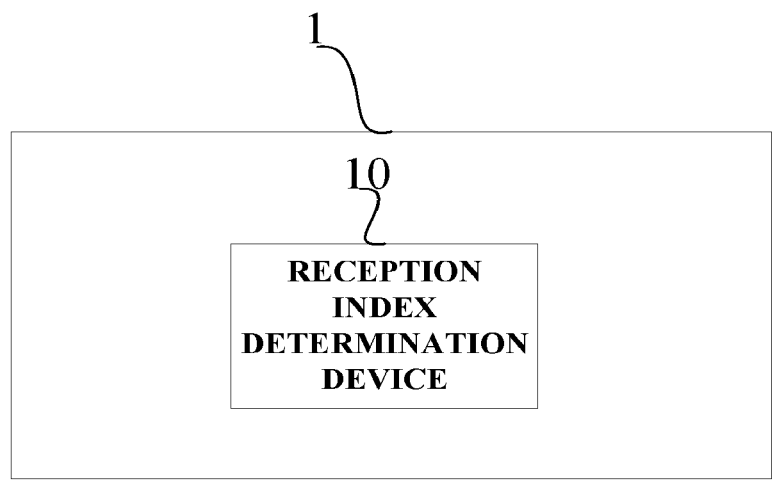
FIG. 1 is a block diagram schematically illustrating an exemplary structure of a communication management apparatus according to an embodiment of the present disclosure.

Person skilled in the art should understand that elements in the figures are illustrated for simplicity and clarity, and are not necessarily drawn to scale. For example, the size of some elements in the accompanying drawings may be enlarged with respect to other elements, so as to facilitate improving the understanding of embodiments of the present disclosure.

DETAILED DESCRIPTION OF THE INVENTION

Exemplary embodiments of the present disclosure are described below in conjunction with the accompanying drawings. For the sake of clarity and conciseness, not all the features of actual implementations are described in the specification. However, it is to be appreciated that during developing any such actual implementations, numerous implementation-specific decisions must be made to achieve the developer's specific goals, for example, compliance with system-related and business-related constraints which will vary from one implementation to another. Moreover, it is also to be appreciated that such a development effort might be very complex and time-consuming, but will nevertheless be a routine task for those skilled in the art having the benefit of this disclosure.

It is further noted that only device structures and/or process steps closely relevant to implementing the present disclosure are illustrated in the drawings while omitting other details less relevant to the present disclosure so as not to obscure the present disclosure due to those unnecessary details.

The inventor discovers that a long transition time of a cell switching state conversion is mainly caused by a cell discovery and a Radio Resource Management (RRM) measurement performed by a terminal apparatus after a cell is switched on. However, in a cell sleep state, making the terminal apparatus capable of performing the cell discovery and the RRM measurement is an effective method to reduce the transition time of the cell switching state conversion. Therefore, the present disclosure provides a scheme of acquiring a reference signal reception index for a neighboring cell of a serving cell of the terminal apparatus based on location information of the terminal apparatus, instead of the RRM measurement, in order to reduce the transition time of the cell switching state conversion, thereby to improve a cell switching performance.

FIG. 1 is a block diagram schematically illustrating an exemplary structure of a communication management apparatus according to an embodiment of the present disclosure.

As shown in FIG. 1, the communication management apparatus 1 includes a reception index determination device 10 for determining, with respect to respective neighboring cells of a serving cell of each terminal apparatus within a predetermined cell, a reference signal reception index for the terminal apparatus according to location information of the terminal apparatus, the reference signal reception index being used for indicating signal reception situation of the terminal apparatus with respect to the neighboring cells.

According to the present disclosure, the predetermined cell may be any one of a macro cell or a micro cell in one cell set. In the present disclosure, the terminal apparatus in the predetermined cell is referred to a terminal apparatus that is located in coverage of the predetermined cell when the predetermined cell is switched on, and the serving cell of the terminal apparatus in the predetermined cell is referred to a cell which currently transmits control channel information for the terminal apparatus. When the predetermined cell is in an ON state, for the terminal apparatus in the predetermined cell, the predetermined cell may be the serving cell thereof, or may be a cooperation cell which provides a cooperation service for it.

According to the present disclosure, the reference signal reception index is information for indicating the signal reception situation of the terminal apparatus with respect to the neighboring cells, and may include, for example, Reference Signal Reception Power (RSRP) and/or Reference Signal Reception Quality (RSRQ).

For a cell that is in the ON state, the reception index determination device 10 may obtain the RSRP of the terminal apparatus with respect to this cell by actually measuring signal power received by the terminal apparatus on all particles of a reference signal that is carried in a certain symbol and calculating an average value of the received signal power, and may obtain the RSRQ of the terminal apparatus with respect to this cell according to a definition of the RSRQ, i.e., RSRQ=N*RSRP/RSSI, in which RSRI indicates Reference Signal Reception Intensity, and N is a number of resource blocks in an RSSI measurement bandwidth of a LTE/LTE-A carrier. In the present disclosure, the RSRP and/or the RSRQ obtained in this manner are referred to as RSRP and/or RSRQ obtained by actual measurement.

For a cell that is in a sleep state, according to the embodiment of the present disclosure, the reception index determination device 10 may estimate the reference signal reception index including the RSRP and the RSRQ for the terminal apparatus with respect to this cell according to the location information of the terminal apparatus.

Figure 2:
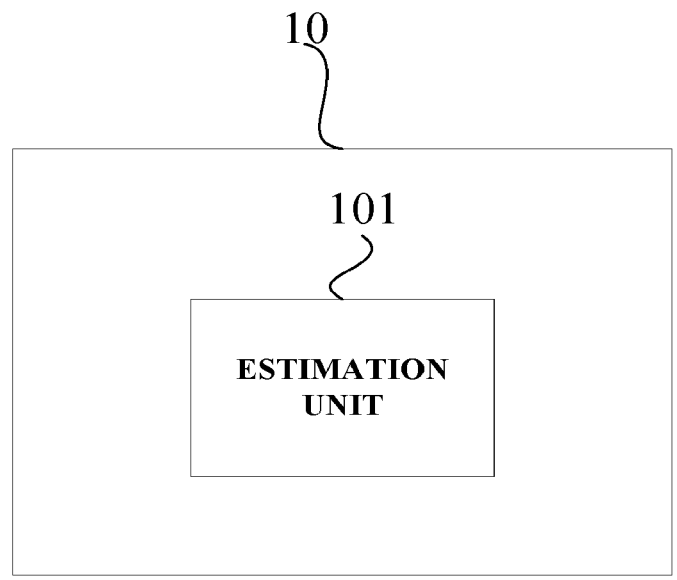
FIG. 2 is a block diagram schematically illustrating an exemplary structure of a reception index determination device 10 in FIG. 1.

FIG. 2 is a block diagram schematically illustrating an exemplary structure of the reception index determination device 10 in FIG. 1.

As shown in FIG. 2, the reception index determination device 10 includes an estimation unit 101 for estimating, with respect to respective neighboring cells, the reference signal reception index for the terminal apparatus according to the location information of the terminal apparatus, so as to determine the reference signal reception index.

According to the embodiment of the present disclosure, the reception index determination device 10 may determine the RSRP and/or the RSRQ for the terminal apparatus through the reference signal reception index that is estimated by the estimation unit 101 with respect to the respective neighboring cells.

Specifically, the estimation unit 101 may estimate the RSRP for the terminal apparatus (for example, a coordinate of the terminal apparatus is (X1, Y1)) from the neighboring cells thereof (for example, a coordinate of a neighboring cell i of the terminal apparatus 1 is $(X_i, Y_i)$) based on the location information of the terminal apparatus and the neighboring cells thereof according to the following Equations (1) to (4):

$$\text{RSRP=Cell Transmission Power−Coupling Loss} \quad (1)$$

$$\text{Coupling Loss=Path Loss+Shadow Fading−Antenna Gain} \quad (2)$$

$$\text{Path Loss (dB)}=36.7lgD_{1-i}(m)+26lgf(\text{GHz})+22.7 \quad (3)$$

$$D_{1-i}=\sqrt{(X1-(X_i^2+)1-Y_i^2} \quad (4)$$

Wherein, the parameter $D_{1-i}$ in Equations (3) and (4) is a distance between the terminal apparatus 1 and the neighboring cell i, and the parameter f in Equation (3) is a carrier frequency. The cell transmission power, the shadow fading, the antenna gain, and the carrier frequency are all known for each cell. In addition, the above Equation (3) for calculating the path loss is a method of calculating a path loss of a micro cell in the well-known NLos scenario, and the detailed description thereof is omitted here.

Based on the estimated RSRP, the estimation unit 101 may further estimate the RSRQ based on the definition of the RSRQ, i.e., RSRQ=N*RSRP/RSSI. Generally, it is assumed that the RSSI is approximately equal to N times of a sum of RSRP of the sleep cell and the neighboring cells thereof.

Specifically, RSRQi of the terminal apparatus with respect to the neighboring cell i in the respective neighboring cells may be estimated according to the following Equation (5):

$$RSRQi = RSRPi \bigg/ \sum_{i=1}^{n} RSRPi \quad (5)$$

Wherein, the RSRPi is the reference signal reception power of the neighboring cell i, n is a number of neighboring cells interference to the neighboring cell i of which is greater than a predetermined interference threshold, and $$\sum_{i=1}^{n} RSRPi$$

is a sum of the reference signal reception power of all cells the interference to the neighboring cell i of which is greater than the predetermined interference threshold.

Taking two neighboring cells B and C of a sleep cell A as an example, the estimation unit 101 may estimate the RSRP of each of the cells A, B, C, i.e., RSRP A, RSRP B, RSRP C, according to the above equations, and then estimate the RSRQ of the cell A, i.e., RSRQ A, according to the following Equation (6):

$$\text{RSRQ } A=\text{RSRP } A/(\text{RSRP } A+\text{RSRP } B+\text{RSRP } C) \quad (6)$$

According to the present disclosure, once obtaining the location information of the terminal apparatus, the communication management apparatus 1 may estimate the RSRP and/or the RSRQ of the terminal apparatus with respect to the neighboring cells thereof.

According to another embodiment of the present disclosure, the reception index determination device 10 may also include an acquisition unit for acquiring the reference signal reception index with respect to the respective neighboring cells from a predetermined database according to the location information of the terminal apparatus, the reference signal reception index of the terminal apparatus acquired by measurement and a location of the terminal apparatus being stored in the predetermined database in association. For example, when a cell is in the ON state, the RSRP/RSRQ with respect to this cell may be measured for the terminal apparatus at different locations, and a mapping relationship between the RSRP/RSRQ and the location of the terminal apparatus and the respective cells are stored in the predetermined database. When obtaining information of respective locations of the terminal apparatus, the communication management apparatus may obtain a series of corresponding RSRP/RSRQ by referring to the mapping relationship between the RSRP/RSRQ and the location of the terminal apparatus and the respective cells that is stored in the predetermined database.

According to an embodiment of the present disclosure, the RSRP/RSRQ for the terminal apparatus may be acquired by estimating the RSRP/RSRQ according to the location information of the terminal apparatus in combination with referring to the predetermined database according to the location information of the terminal apparatus. Specifically, the corresponding RSRP/RSRQ may be actually measured in a complex region of geographic location (for example, a complex region defined by a base station), and its mapping relationship may be stored in the predetermined database; when the serving cell/network terminal obtains the location information of the terminal apparatus, if the terminal apparatus is located in the complex region of geographic location, the corresponding RSRP/RSRQ is obtained by the acquisition unit referring to the predetermined database, otherwise the RSRP/RSRQ is estimated by the estimation unit 101 in the manner as described above. In this way, the reference signal reception index may be determined more accurately for the terminal apparatus.

Figure 3:
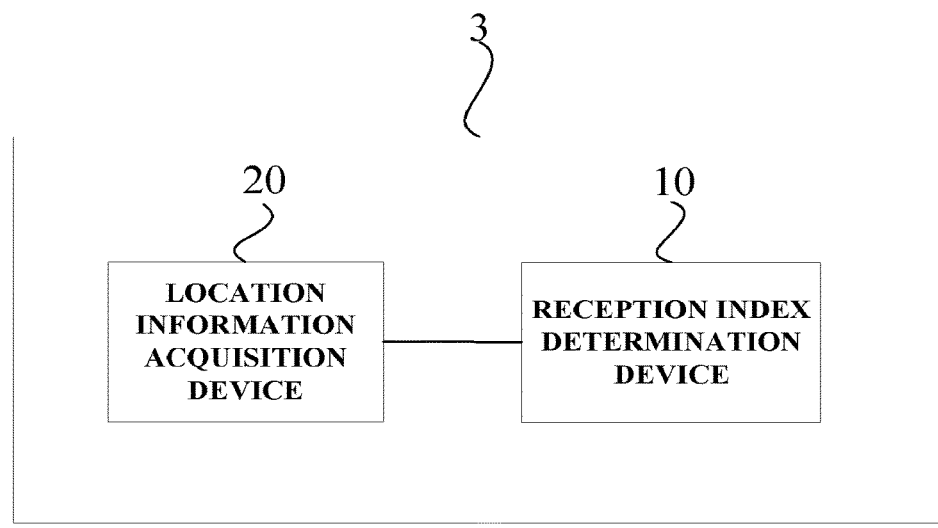
FIG. 3 is a block diagram schematically illustrating another exemplary structure of the communication management apparatus according to the embodiment of the present disclosure.

FIG. 3 is a block diagram schematically illustrating another exemplary structure of the communication management apparatus according to the embodiment of the present disclosure.

As shown in FIG. 3, except for a reception index determination device 10 as that included in the communication management apparatus 1 in FIG. 1, the communication management apparatus 3 also includes a location information acquisition device 20 for performing a configuration with respect to each terminal apparatus, such that the terminal apparatus transmits the location information thereof to the communication management apparatus periodically or aperiodically, so as to acquire the location information of the terminal apparatus.

According to the present disclosure, the location information acquisition device 20 may obtain the location information of the terminal apparatus according to a positioning algorithm defined in 3GPP TS 36.305 (such as Assist-Global Navigation Satellite System (A-GNSS), Observed Time Difference Of Arrival (OTDOA), and Enhanced-Cell Identifier (E-CID) positioning algorithm) or another effective positioning algorithm.

According to a preferred embodiment of the present disclosure, for transmitting the location information aperiodically, the location information acquisition device 20 may be configured to trigger the terminal apparatus by RRC signaling to transmit the location information thereof to the communication management apparatus when at least one of the following conditions is satisfied: (i) the predetermined cell or a neighboring cell thereof determines that there needs to perform load balance or cell switching based on the current interference and/or load situation; and (ii) a change in location of the terminal apparatus exceeds a first threshold. For transmitting the location information periodically, the location information acquisition device 20 may configure a transmission cycle flexibly based on the actual situation to configure the terminal apparatus to transmit the location information thereof to the communication management apparatus periodically.

As shown in FIG. 3, based on the location information of each terminal apparatus in the predetermined cell that is acquired by the location information acquisition device 20, the reception index determination device 10 may determine, with respect to the respective neighboring cells of the serving cell of the terminal apparatus, the reference signal reception index for the terminal apparatus.

Figure 4:
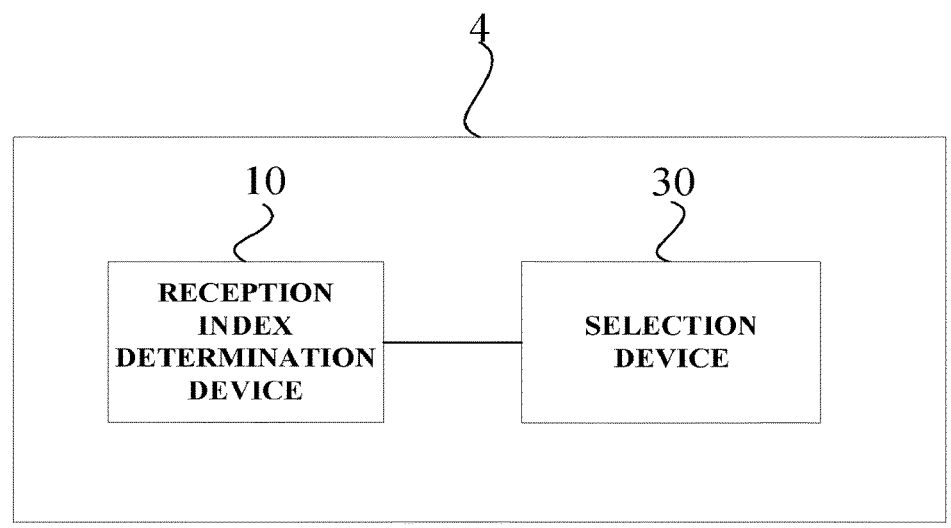
FIG. 4 is a block diagram schematically illustrating yet another exemplary structure of the communication management apparatus according to the embodiment of the present disclosure.

FIG. 4 is a block diagram schematically illustrating yet another exemplary structure of the communication management apparatus according to the embodiment of the present disclosure.

As shown in FIG. 4, except for a reception index determination device 10 as that included in the communication management apparatus 1 in FIG. 1, the communication management apparatus 4 also includes a selection device 30 for selecting, when a switching state conversion is to be performed in the predetermined cell, a target serving cell for the terminal apparatus before the switching state conversion is performed in the predetermined cell according to the reference signal reception index of the terminal apparatus, as the serving cell after the switching state conversion is performed in the predetermined cell.

According to a preferred embodiment of the present disclosure, the selection device may be configured to select, when an ON state is to be converted to an OFF state in the predetermined cell, an underloading cell among a cell corresponding to the highest reference signal reception index of the terminal apparatus or a cell having a reference signal reception index greater than a reception index threshold within the neighboring cells of the predetermined cell as the target serving cell of the terminal apparatus before the switching state conversion is performed in the predetermined cell.

After selecting the target serving cell, the selection device 30 may transmit a identifier, an OFF time, an Channel State Information Reference Symbol and an Interference Measure Resource configuration of the predetermined cell to the target serving cell and a cooperation cell that provides service to a cooperation terminal apparatus within the predetermined cell, and transmit apparatus information of the terminal apparatus to the target serving cell. According to the present disclosure, the selection unit 30 may notify the selected target serving cell and the cooperation cell that provides service to the cooperation terminal apparatus within the predetermined cell of an OFF decision of the predetermined cell through an X2 interface, including transmitting the above parameters to them.

According to a preferred embodiment of the present disclosure, the selection device is configured to select, when the OFF state is to be converted to the ON state in the predetermined cell, the predetermined cell as the target serving cell for the terminal apparatus that satisfies a first predetermined condition within the predetermined cell before the switching state conversion is performed in the predetermined cell. According to the first predetermined condition, the reference signal reception index of the terminal apparatus with respect to the serving cell thereof is less than a second threshold, and the reference signal reception index of the terminal apparatus with respect to the predetermined cell is greater than a third threshold, or the difference between the reference signal reception index of the terminal apparatus with respect to the predetermined cell and the reference signal reception index of the terminal apparatus with respect to the serving cell thereof is greater than a forth threshold.

Those skilled in the art shall understand that the above first threshold, second threshold, third threshold, and the fourth threshold may be selected flexibly according to an actual requirement.

According to the present disclosure, the selection device 30 is further configured to transmit the identifier and an ON time of the predetermined cell in which the OFF state is to be converted to the ON state to a current serving cell of the terminal apparatus. For example, the selection device 30 may also transmit the above information to the current serving cell of the terminal apparatus through the X2 interface.

According to an embodiment of the present disclosure, the selection device 30 is further configured to transmit information about a carrier and an identifier of the target serving cell to the terminal apparatus, so as to simplify a cell selection operation performed on the carrier by the terminal apparatus.

Although the communication management apparatus 4 shown in FIG. 4 includes only the reception index determination device 10 and the selection device 30, those skilled in the art shall understand that the communication management apparatus 4 may also include the location information acquisition device 20 as shown in FIG. 3.

According to an embodiment of the present disclosure, the selection device 30 selects the target serving cell for the terminal apparatus in advance before the switching state conversion is performed in the predetermined cell, and notifies the terminal apparatus of the information about the carrier and the identifier of the target serving cell through for example RRC signaling or downlink control information, such that the terminal apparatus perform a cell search operation only on the carrier of the selected target serving cell, thereby to reduce the cell search time and improve the cell switching performance.

Figure 5:
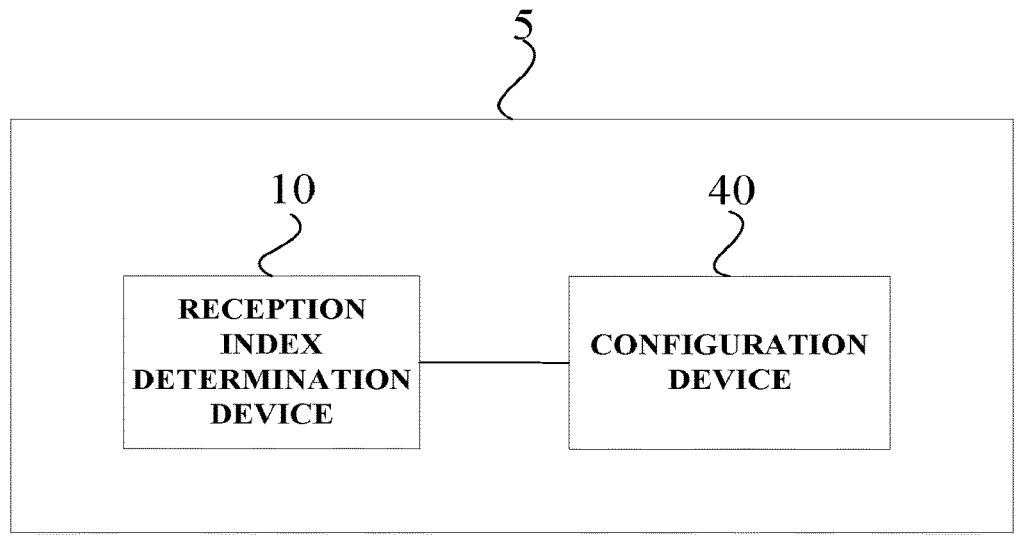
FIG. 5 is a block diagram schematically illustrating another exemplary structure of the communication management apparatus according to the embodiment of the present disclosure.

FIG. 5 is a block diagram schematically illustrating another exemplary structure of the communication management apparatus according to the embodiment of the present disclosure.

As shown in FIG. 5, except for a reception index determination device 10 as that included in the communication management apparatus 1 in FIG. 1, the communication management apparatus 5 also includes a configuration device 40 for updating a configuration of a Channel State Indication Reference Signal (CSI-RS) and an Interference Measure Resource (IMR) of the predetermined cell according to the switching state conversion of the predetermined cell in which the switching state conversion is to be performed, such that each terminal apparatus within the predetermined cell performs a reference signal estimation and measures an interference by the updated CSI-RS and IMR configuration.

According to a preferred embodiment of the present disclosure, the configuration device 40 may also update a measurement set of each terminal apparatus within the predetermined cell according to the switching state conversion of the predetermined cell in which the switching state conversion is to be performed. Specifically, when the ON state is converted to the OFF state in the predetermined cell, the configuration device 40 deletes the predetermined cell from the measurement set of the terminal apparatus within the predetermined cell; when the OFF state is converted to the ON state in the predetermined cell, the configuration device 40 adds the predetermined cell to the measurement set of the terminal apparatus within the predetermined cell.

Although the communication management apparatus 5 shown in FIG. 5 includes only the reception index determination device 10 and the configuration device 40, those skilled in the art shall understand that the communication management apparatus 5 may also include the location information acquisition device 20 as shown in FIG. 3 and/or the selection device 30 as shown in FIG. 4.

Generally, the cell switching may largely affect a performance (in particular, a requirement for Coordinated Multiple Points (COMP) and a requirement for changing the measurement set in real time) of the cooperation terminal apparatus located at a cell edge which needs the cooperation service provided by plural cells. Therefore, in order to meet the requirement of the cooperation terminal apparatus, the present disclosure proposes to change the corresponding CSI-RS and IMR configuration in advance before the cell switching state conversion is performed.

The cooperation terminal apparatus that needs the cell cooperation may be determined using any method known in the related art. For example, the cooperation terminal apparatus may be determined using a method of identifying location information of the cooperation terminal apparatus.

According to an embodiment of the present disclosure, it can determine whether or not a terminal apparatus is the cooperation terminal apparatus based on the reference signal reception index that is determined by the reception index determination device 10 for the terminal apparatus.

Figure 6:
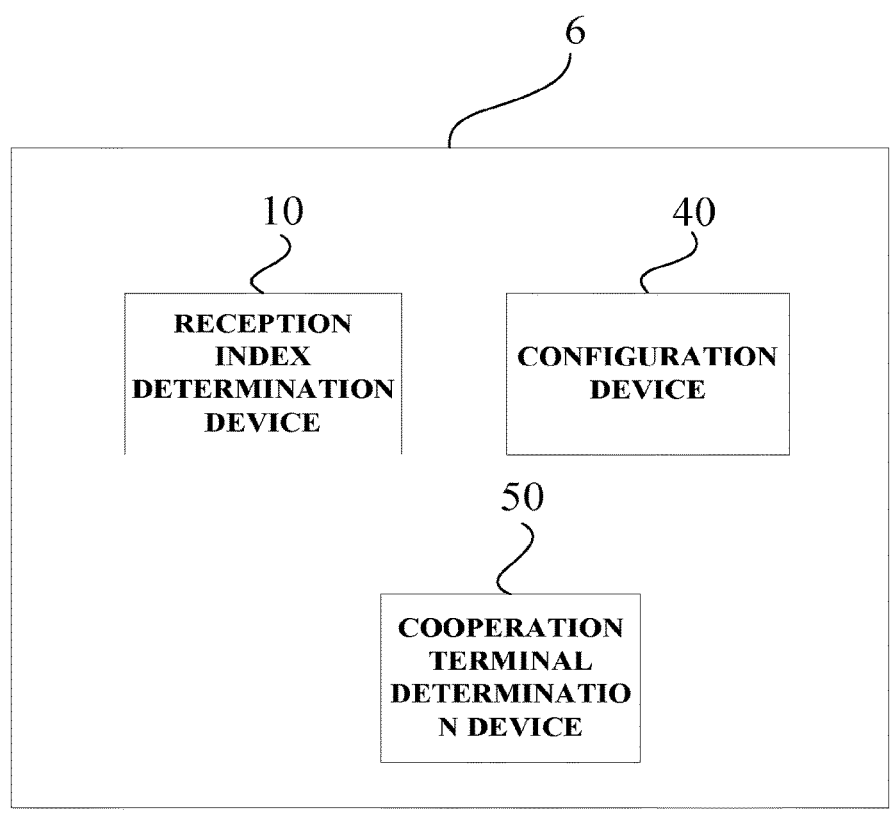
FIG. 6 is a block diagram schematically illustrating yet another exemplary structure of the communication management apparatus according to the embodiment of the present disclosure.

FIG. 6 is a block diagram schematically illustrating yet another exemplary structure of the communication management apparatus according to the embodiment of the present disclosure.

As shown in FIG. 6, except for a reception index determination device 10 and the configuration device 40 as those included in the communication management apparatus 5 in FIG. 5, the communication management apparatus 5 also includes a cooperation terminal apparatus determination device 50 for determining, with respect to the terminal apparatus within the predetermined cell in which the switching state conversion is to be performed, whether or not the terminal apparatus is the cooperation terminal apparatus that needs a cell cooperation according to the reference signal reception index of the terminal apparatus with respect to the predetermined cell and each of the neighboring cells and the reference signal reception index of the terminal apparatus with respect to the serving cell thereof; wherein the configuration device 40 is further configured to, with respect to the cooperation terminal apparatus within the predetermined cell in which the switching state conversion is to be performed, update the CSI-RS and IMR configuration of the predetermined cell, and configure an aperiodical CSI request for all terminal apparatuses within the predetermined cell and the neighboring cells thereof.

For example, the cooperation terminal apparatus determination device 50 may determine whether or not a terminal apparatus is the cooperation terminal apparatus based on the reference signal reception index that is determined by the reception index determination device 10 for the terminal apparatus, and accordingly determine an effect on a cooperation requirement and the measurement set of the terminal apparatus caused by switching of the predetermined cell in advance. For example, the cooperation terminal apparatus determination device 50 may determine whether or not a terminal apparatus is the cooperation terminal apparatus according to the following Equation (7):

$$RSRP_{S\_cell} - RSRP_i < \lambda \qquad (7)$$

Wherein, the $RSRP_{S\_cell}$ and $RSRP_i$ represent the RSRP of the serving cell of the terminal apparatus and the RSRP of a neighboring cell of the serving cell respectively, and the parameter $\lambda$ may be selected flexibly according to an actual requirement of the system.

When the cooperation terminal apparatus determination device 50 determines the cooperation terminal apparatus, the configuration device 40, with respect to the cooperation terminal apparatus within the predetermined cell in which the switching state conversion is to be performed, updates the CSI-RS and IMR configuration of the predetermined cell, and configures the aperiodical CSI request for all terminal apparatuses within the predetermined cell and the neighboring cells thereof.

Specifically, when the ON state is converted to the OFF state in the predetermined cell, the interference to the cooperation terminal apparatus located at the edge may be reduced to some extent, and therefore the configuration device 40 is used for changing a cooperation scheme and a measurement set configuration for such cooperation terminal apparatus and changing the corresponding CSI-RS/IMR configuration in time. Specifically, the configuration device 40 may delete the predetermined cell that is to be switched off from the measurement set of the cooperation terminal apparatus, and modify the corresponding CSI-RS/IMR configuration situation. Furthermore, it may transmit the updated CSI-RS/IMR configuration to the cooperation terminal apparatus by broadcasting or RRC high level signaling, and configure the aperiodical CSI request for all terminal apparatuses by broadcasting, RRC signaling, or downlink control signaling, such that the cooperation terminal apparatus performs the measurement on the corresponding CSI-RS/IMR and reports an appropriate Channel Quality Indicator (CQI).

When the OFF state is converted to the ON state in the predetermined cell, the interference to the terminal apparatus located at the edge may be severe, and therefore there needs to provide the cooperation service for such terminal apparatus and the configuration device 40 configures the corresponding CST-RS/IMR in time. Specifically, the configuration device 40 may transmit the updated CSI-RS/IMR configuration to the cooperation terminal apparatus by broadcasting or RRC high level signaling, and configure the aperiodical CSI request for all terminal apparatuses by broadcasting, RRC signaling, or downlink control signaling, such that the terminal apparatus performs the measurement on the corresponding CSI-RS/IMR and reports an appropriate CQI.

An effect on the measurement set of the terminal apparatus located at the edge caused by the cell switching will be described by taking the cell set shown in FIG. 7 as an example.

Figure 7:
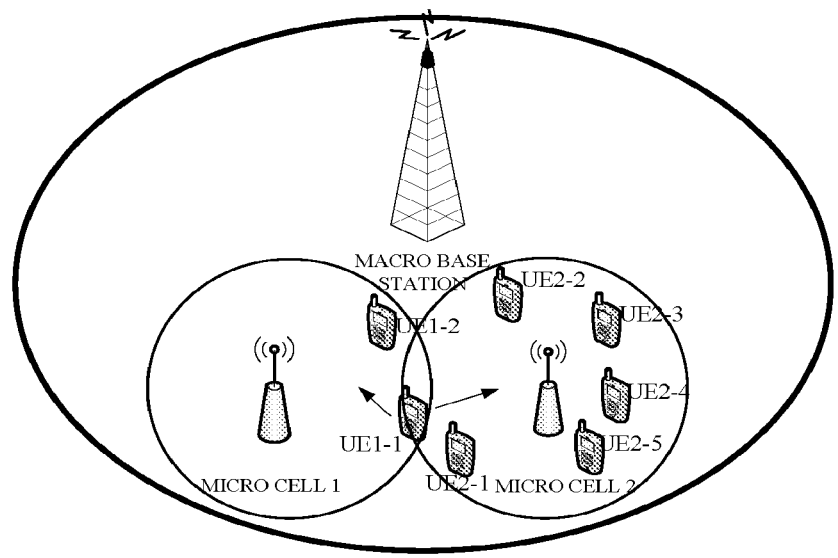
FIG. 7 shows an example of a cell set including a macro cell and a micro cell.

As shown in FIG. 7, the cell set includes a macro cell, a micro cell 1 and a micro cell 2. When the ON state is to be converted to the OFF state in the micro cell 1, a cooperation terminal apparatus may become a non-cooperation terminal apparatus as it does need cooperation to meet its performance requirement, such as UE1-1 and UE2-1; and other cooperation terminal apparatus needs to change the measurement set, such as UE1-2, and thereby the configuration device 40 deletes the micro cell 1 from the measurement set {macro cell, micro cell 1, micro cell 2} of UE1-2. In contrast, when the OFF state is to be converted to the ON state in the micro cell 1, a non-cooperation terminal apparatus may become a cooperation terminal apparatus as it needs cooperation to meet its performance requirement, such as UE1-1 and UE2-1; and other cooperation terminal apparatus needs to change the measurement set, such as UE1-2, and thereby a measurement set changing unit in the configuration device 40 adds the micro cell 1 to its original measurement set {macro cell, micro cell 2}.

According to the present disclosure, the switching state conversion of the predetermined cell may also be pre-decided based on the reference signal reception index of each terminal apparatus that is acquired in advance by the reception index determination device based on the location information of each terminal apparatus in the predetermined cell.

Figure 8:
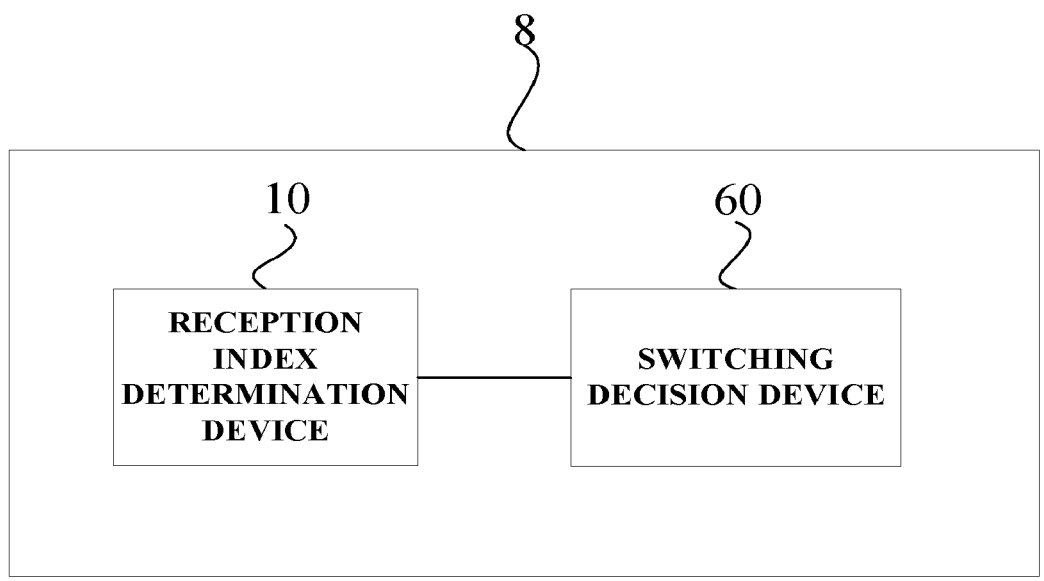
FIG. 8 is a block diagram schematically illustrating another exemplary structure of the communication management apparatus according to the embodiment of the present disclosure.

FIG. 8 is a block diagram schematically illustrating another exemplary structure of the communication management apparatus according to the embodiment of the present disclosure.

As shown in FIG. 8, except for a reception index determination device 10 as that included in the communication management apparatus 1 in FIG. 1, the communication management apparatus 8 also includes a switching decision device 60 for performing a decision of the switching state conversion of the predetermined cell based on the reference signal reception index determined by the reception index determination device.

According to a preferred embodiment of the present disclosure, the switching decision device 60 is further configured to, when the predetermined cell is in the OFF state, decide that the predetermined cell is to be switched on if a number of the terminal apparatuses that satisfy the first predetermined condition within the predetermined cell is greater than or equal to a predetermined number; and when the predetermined cell is in the ON state, decide that the predetermined cell is to be switched off if all the terminal apparatuses that take the predetermined cell as the serving cell satisfy a second predetermined condition, wherein the second predetermined condition is that the reference signal reception index of the terminal apparatus with regard to at least one cell outside the predetermined cell is greater than a fifth threshold. Herein, the first predetermined condition may be the first predetermined condition that is described when selecting the target serving cell for the terminal apparatus in the case where the OFF state is to be converted to the ON state in the predetermined cell.

Specifically, it is assumed that there are M terminal apparatuses within the predetermined cell that is in the ON state, and as for each of the M terminal apparatuses, if there is at least one neighboring cell which satisfies the following Equation (8), the switching decision device 60 may decide that the predetermined cell is to be switched off; and if there is a predetermined number N (N≥K) of the terminal apparatuses which satisfy the following Equation (9), the switching decision device 60 may decide that the predetermined cell is to be switched on.

$$RSRP_{N\_cell} > \Delta \quad (8)$$

$$\begin{cases} RSRP_{S\_cell} < a \\ RSRP_{D\_cell} - RSRP_{S\_cell} > b \text{ or } RSRP_{D\_cell} > c \end{cases} \quad (9)$$

Wherein, the $RSRP_{S\_cell}$, $RSRP_{N\_cell}$, $RSRP_{D\_cell}$ represent the RSRPs of the serving cell, the neighboring cell, the predetermined cell of the terminal apparatus respectively, the parameter K may be selected flexibly according to an actual requirement of the system, and the parameters a, b, c, Δ are the second threshold, the third threshold, the fourth threshold, the fifth threshold respectively.

In comparison with the micro cell switching rules (such as arrival/completion of a data packet, arrival/exit of a terminal apparatus, load situation, interference of a neighboring cell, and decision on cooperation of terminal apparatus-cell) specified in the 3GPP RAN1 conference, in the present disclosure, the decision is performed by using the reference signal reception index of the terminal apparatus that is acquired based on the location information of the terminal apparatus, such that the complexity is reduced and the system performance is secured.

Figure 9:
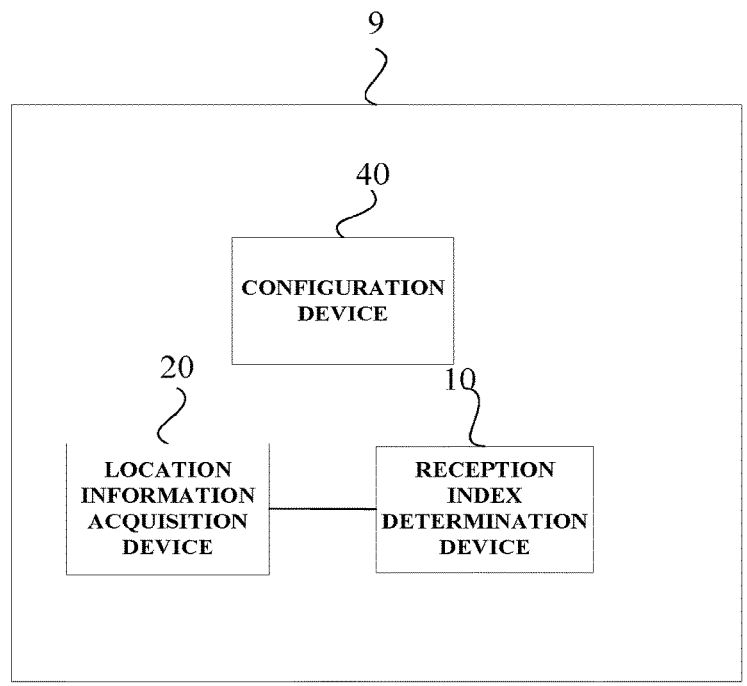
FIG. 9 is a block diagram schematically illustrating yet another exemplary structure of the communication management apparatus according to the embodiment of the present disclosure.

FIG. 9 is a block diagram schematically illustrating yet another exemplary structure of the communication management apparatus according to the embodiment of the present disclosure.

As shown in FIG. 8, the communication management apparatus 9 includes a reception index determination device 10, a location information acquisition device 20, and a configuration device 40. The reception index determination device 10, the location information acquisition device 20, and the configuration device 40 as shown in FIG. 9 have a similar configuration as the reception index determination device 10, the location information acquisition device 20, and the configuration device 40 described with reference to FIGS. 1 to 8 and the description thereof will be omitted here.

According to the present disclosure, except for the configuration of the location information acquisition device 20 and the configuration device 40 as those described with reference to FIGS. 1 to 8, the configuration device 40 as shown in FIG. 9 may also configure the predetermined cell to perform the switching state conversion periodically, and the location information acquisition device 20 may also be configured to perform a configuration to the terminal apparatus, such that the terminal apparatus transmits the location information thereof to the communication management apparatus periodically according to the ON time and the OFF time of the predetermined cell.

It is assumed that the configuration device 40 configures the predetermined cell to be switched off at time t1 and switched on at time t2. In this case, two time parameters T1 and T2 may be provided, which represent the times by which the reference signal reception index is acquired in advance respectively. The location information acquisition device 20 may be configured to configure the terminal apparatus within the predetermined cell, such that the terminal apparatus may transmit the location information thereof to the communication management apparatus periodically at time t1-T1 (for the case where the predetermined cell is in the OFF state) or time t2-T2 (for the case where the predetermined cell is in the ON state), for example, and thereby the reception index determination device 10 may determine the reference signal reception index for the terminal apparatus according to the location information of the terminal apparatus that is acquired by the location information acquisition device 20, including estimating the RSRP and/or RSRQ of the terminal apparatus according to Equation (1) to (4) as described above.

The configuration device may configure the CSI-RS and IMR of the predetermined cell periodically and aperiodically based on the reference signal reception index determined for the terminal apparatus by the reception index determination device 10.

Figure 10:
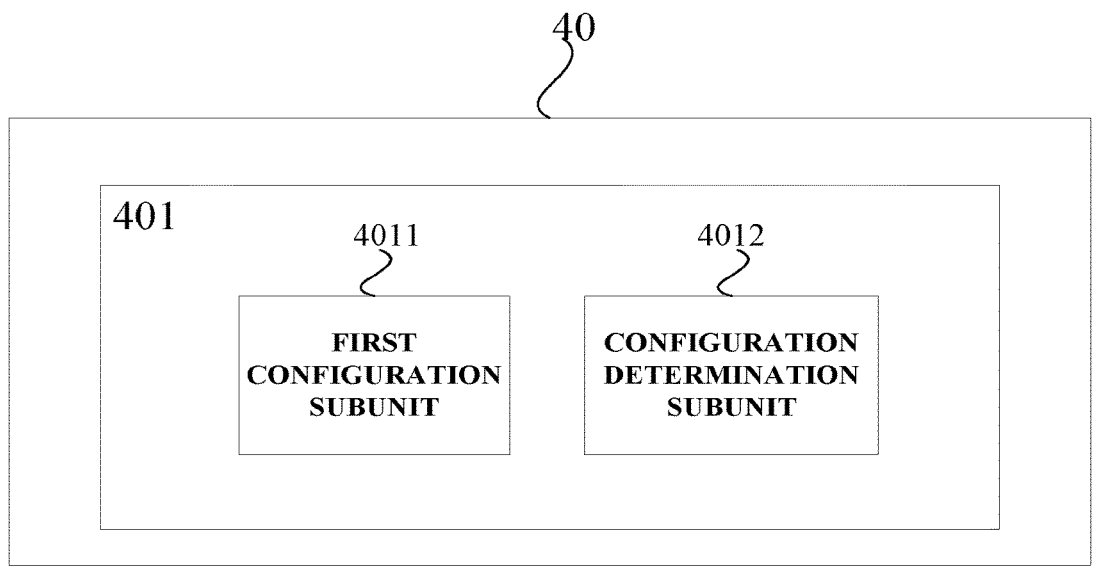
FIG. 10 is a block diagram schematically illustrating an exemplary structure of a configuration device 40 in FIG. 9.

FIG. 10 is a block diagram schematically illustrating an exemplary structure of a configuration device 40 in FIG. 9.

As shown in FIG. 10, the configuration device 40 comprises a periodical configuration unit 401 for performing, with respect to the cooperation terminal apparatus within the predetermined cell in which the switching state conversion is to be performed, a periodical configuration to the CSI-RS and IMR of the predetermined cell. The periodical configuration unit 401 includes a first configuration subunit 4011 for configuring a first periodical CSI-RS and IMR set including the CSI-RS and IMR configuration that is required by all possible accessed terminal apparatuses within the predetermined cell; and a configuration determination subunit 4012 for determining the CSI-RS and IMR configuration that is to be measured by the cooperation terminal apparatus in the first periodical CST-RS and IMR set according to the location information or the reference signal reception index of the cooperation terminal apparatus of the predetermined cell.

The first configuration subunit 4011 configures the first periodical CST-RS and IMR set for the predetermined cell, and the periodical CSI-RS and IMR set may include all possible CSI-RS/IMR configurations that are required by all possible accessed terminal apparatuses within the predetermined cell and related cells thereof. The first configuration subunit 4011 may also transmit information about the configured periodical CSI-RS and IMR set to each terminal apparatus by paging, broadcasting, or high level RRC signaling, such that the terminal apparatus stores the information locally after receiving it.

When the cooperation terminal apparatus determination device 50 described with reference to FIG. 6 determines in advance that there is the cooperation terminal apparatus out of the terminal apparatuses within the predetermined cell, for example, according to the location information, the reference signal reception index, or the terminal apparatus requirement of the terminal apparatus, the configuration determination subunit 4012 determines the CSI-RS and IMR configuration that is to be measured by each cooperation terminal apparatus in the first periodical CSI-RS and IMR set according to the reference signal reception index, and transmit information about the determined CSI-RS and IMR configuration to the cooperation terminal apparatus by RRC signaling or downlink control information. Optionally, the configuration determination subunit 4012 may also determine the CSI-RS and IMR configuration that is to be measured in the first periodical CSI-RS and IMR set according to the location information of the terminal apparatus.

After the first configuration subunit 4011 configures the periodical CSI-RS and IMR set and the configuration determination subunit 4012 determines the CSI-RS and IMR configuration that is to be measured by the cooperation terminal apparatus, when the switching operation is performed in the predetermined cell, the predetermined cell selects a corresponding CSI-RS and IMR configuration. According to the switching cycle of the predetermined cell, the configuration device 40 may configure a new periodical CSI report for the terminal apparatus, such that the terminal apparatus in the predetermined cell may query the corresponding CSI-RS and IMR configuration locally and make a measurement report.

It is described above that corresponding periodical CSI-RS and IMR is configured for a cell in combination with periodical switching configuration property of the cell, and this periodical configuration of the CSI-RS and IMR can largely reduce the interaction signaling between cells and the cooperation delay, thereby to improve the system performance.

Figure 11:
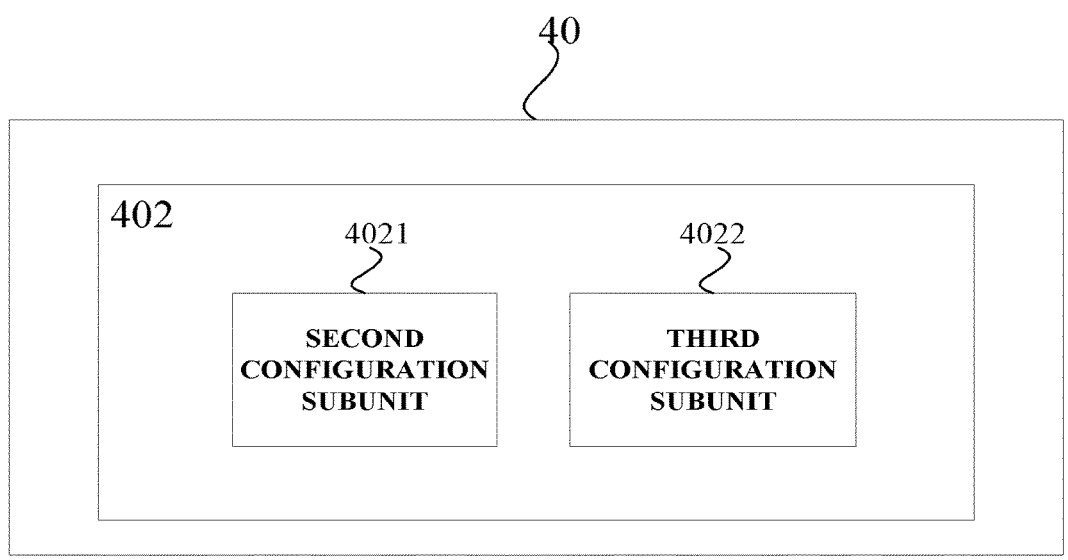
FIG. 11 is a block diagram schematically illustrating another exemplary structure of the configuration device 40 in FIG. 9.

FIG. 11 is a block diagram schematically illustrating another exemplary structure of the configuration device 40 in FIG. 9.

As shown in FIG. 11, the configuration device 40 includes a triggered configuration unit 402 performing, with respect to the cooperation terminal apparatus within the predetermined cell in which the switching state conversion is to be performed, a triggered configuration to the CST-RS and IMR of the predetermined cell. The triggered configuration unit 402 includes a second configuration subunit 4021 for configuring a second periodical CSI-RS and IMR set including the CSI-RS and IMR configuration that is required by all non-cooperation terminal apparatuses within the predetermined cell; and a third configuration subunit 4022 for configuring the CSI-RS and IMR for the cooperation terminal apparatus according to the location information or the reference signal reception index of the cooperation terminal apparatus of the predetermined cell based on the switching state conversion of the predetermined cell.

The second configuration subunit 4021 configures the second periodical CSI-RS and IMR set for the cell set including the predetermined cell. Unlike the first periodical CSI-RS and IMR set, the second periodical CSI-RS and IMR set includes only the CSI-RS and IMR configuration that is required by the non-cooperation terminal apparatus in the cell set. The second configuration subunit 4021 may also transmit information about the configured periodical CSI-RS and IMR set to each terminal apparatus by paging, broadcasting, or high level RRC signaling, such that the terminal apparatus stores the information locally after receiving it.

When the cooperation terminal apparatus determination device 50 described with reference to FIG. 6 determines in advance that there is the cooperation terminal apparatus out of the terminal apparatuses within the predetermined cell, for example, according to the location information, the reference signal reception index, or the terminal apparatus requirement of the terminal apparatus, the third configuration subunit 4022 triggers the predetermined cell to modify the CSI-RS and IMR configuration. When the ON state is to be converted to the OFF state in the predetermined cell, the third configuration subunit 4022 deletes the predetermined cell from the measurement set of the cooperation terminal apparatus, and modifies the corresponding CSI-RS/IMR configuration. When the OFF state is to be converted to the ON state in the predetermined cell, the third configuration subunit 4022 transmits a cooperation request to the predetermined cell for the cooperation terminal apparatus, including information, the measurement set, and the corresponding CSI-RS and IMR configuration of the cooperation terminal apparatus. For example, the third configuration subunit 4022 may transmit information about the updated CSI-RS and IMR configuration to each cooperation terminal apparatus by broadcasting or RRC high level signaling.

When the switching operation is performed in the predetermined cell, the predetermined cell selects the corresponding CSI-RS and IMR configuration. According to the switching cycle of the predetermined cell, the configuration device 40 may configure a new periodical CSI report for the terminal apparatus, such that the non-cooperation terminal apparatus in the predetermined cell queries the corresponding CSI-RS and IMR configuration locally and makes a measurement report, and the cooperation terminal apparatus makes a measurement report according to the received updated CSI-RS and IMR configuration.

It is described above that appropriate CSI-RS and IMR is configured for a cell in consideration of a requirement of the cooperation terminal apparatus. Such a triggered configuration manner is flexible and can save overhead of the CSI-RS and IMR.

According to an embodiment of the present disclosure, there is provided a communication management method. An exemplary process of the communication management method will be described below with reference to FIG. 12.

Figure 12:
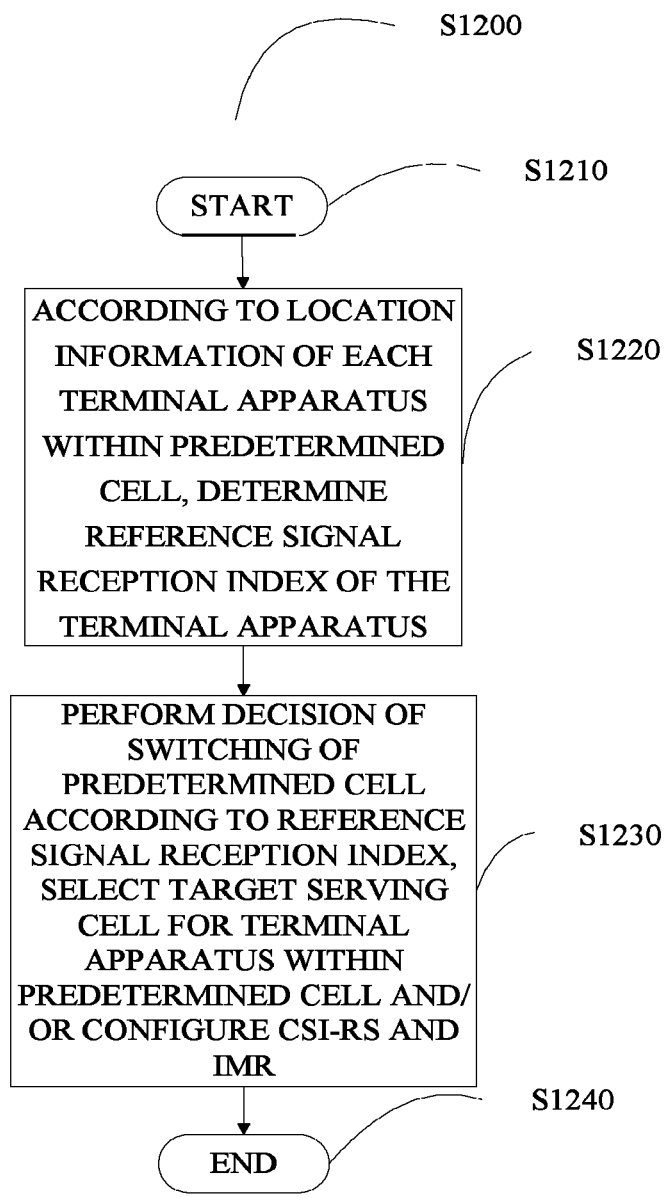
FIG. 12 is a flowchart schematically illustrating a communication management method according to an embodiment of the present disclosure.

As shown in FIG. 12, a process 1200 of the communication management method according to the embodiment of the present disclosure starts with S1210, and then proceeds to S1220.

In S1220, with respect to respective neighboring cells of a serving cell of each terminal apparatus within a predetermined cell, a reference signal reception index for the terminal apparatus is determined according to location information of the terminal apparatus. According to the embodiment of the present disclosure, the reference signal reception index is used for indicating signal reception situation of the terminal apparatus with respect to the neighboring cells, and may include Reference Signal Reception Power (RSRP) and/or Reference Signal Reception Quality (RSRQ). The processing of S1220 may be referred to the operation of the reception index determination device described with reference to FIGS. 1 to 11, and the detailed description thereof is omitted here. Then the process proceeds to S1230.

In S1230, a decision of switching of the predetermined cell is performed according to the reference signal reception index of the terminal apparatus, and when a switching state conversion is to be performed in the predetermined cell, a target serving cell is selected for the terminal apparatus within the predetermined cell and/or a Channel State Indication Reference Signal (CSI-RS) and an Interference Measure Resource (IMR) are configured for the predetermined cell and the neighboring cells thereof. The processing of S1230 may be referred to the operation of the switching decision device described with reference to FIG. 8, the selection device described with reference to FIG. 4, and the configuration device described with reference to FIG. 5, and the detailed description thereof is omitted here. Then the process proceeds to S1240.

The process 1200 ends in S1240.

In comparison with the prior art, the communication management apparatus and the communication management method according to the embodiments of the present disclosure can realize at least one of the following: being capable of determining in advance the reference signal reception index with respect to the neighboring cells according to the location information of the terminal apparatus even the cell is in the OFF state, thereby to improve the cell switching performance; determining the target serving cell for the terminal apparatus within the cell in which the switching state conversion is to be performed with the reference signal reception index that is determined in advance, thereby to reduce the cell search time and improve the cell switching performance; reducing complexity of the conventional cell switching decision solution by performing the decision of the cell switching with the determined reference signal reception index; being capable of changing the cooperation requirement and measurement set of the cooperation terminal device and the corresponding CSI-RS and IMR configuration in real time; and the like.

The dynamic cooperation that is used in the prior art may be perfectly adaptive to a change in the environment, and may achieve a better performance. However, this manner is complex, and the implementation cost thereof is high. In an application with a high cell density, many terminal apparatuses have a requirement for cooperation, and the corresponding CSI-RS and IMR configuration of a dynamic cooperation set needs a large amount of coordination between cells, which increases the scheduling delay. In particular, in view that the actual return link is not ideal and the link delay is large, the decision of cooperation may be much later than the channel situation reported by the terminal apparatus or the requirement of the terminal apparatus, which may severely reduce the performance of the cooperation terminal apparatus. Therefore, the present disclosure provides a communication management apparatus of semi-static CSI-RS and IMR configuration.

The communication management apparatus according to the embodiment of the present disclosure is used to configure the CSI-RS and IMR for each cell within a cell set including plural cells.

Figure 13:
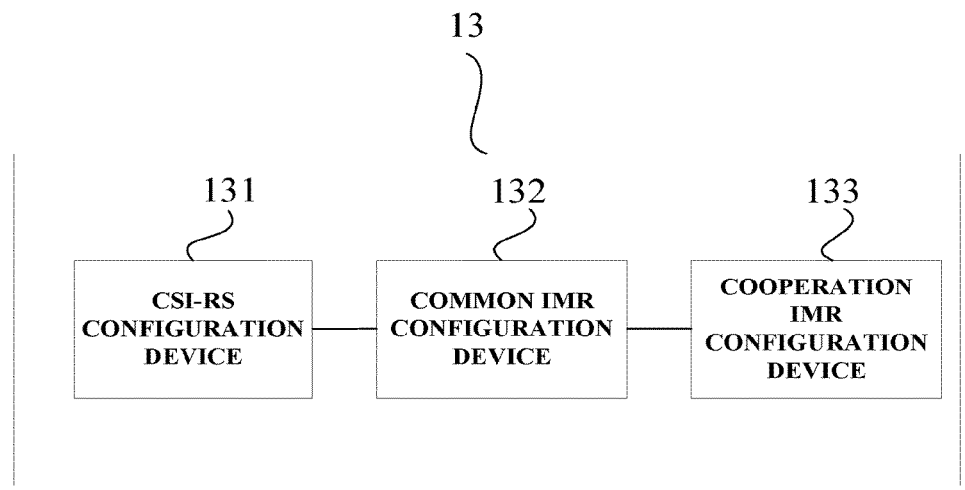
FIG. 13 is a block diagram schematically illustrating an exemplary structure of a communication management apparatus according to another embodiment of the present disclosure.

FIG. 13 is a block diagram schematically illustrating an exemplary structure of a communication management apparatus according to another embodiment of the present disclosure.

As shown in FIG. 13, the communication management apparatus 13 includes a CSI-RS configuration device 131 for configuring a CSI-RS for all cells in the cell set, thereby to determine a CSI-RS set including the configured CSI-RS; a common IMR configuration device 132 for configuring, with respect to each cell of the cell set, a IMR of the cell in a location in which the IMR is not configured for neighboring cells of the cell, to determine a common IMR set in which the IMRs of respective cells are orthogonal to each other; and a cooperation IMR configuration device 133 for configuring, with respect to each cooperation terminal apparatus within each cell of the cell set, the IMR of each cooperation cell according to a geographic location or a reference signal reception index of the cooperation terminal apparatus, thereby to form a cooperation IMR set including the IMR of each cooperation terminal apparatus with respect to the cooperation cell thereof, wherein the reference signal reception index is used for indicating signal reception situation of the cooperation terminal apparatus with respect to the neighboring cells.

The cell set according to the present disclosure may be a cell cluster or a cell set that is planned according to network. According to the present disclosure, the communication management apparatus 13 configures the CSI-RS set and IMR set integrally for the cell set, wherein the CSI-RSs and IMRs in the sets are orthogonal to each other. When a conflict between identifiers of the cells in the cell set occurs, it can be distinguished according to the CSI-RS or IMR.

According to an embodiment of the present disclosure, the CSI-RS configuration device 131 may configure the CSI-RS set including all CSI-RS configurations for all cells in the cell set. The common IMR configuration device 132 may transmit information about the CSI-RS set to each terminal apparatus within the cell set by broadcasting, paging, or RRC signaling.

The common IMR configuration device 132 is used to determine the common IMR set that supports all terminal apparatuses within the cell set to perform an interference measurement for serving cell. Table 1 shows an example of the common IMR set configuration. As shown in Table 1, "ON" with respect to each cell in the table indicates that the cell configures the IMR in a location (that is, no signal is transmitted, and this time frequency resource is not used), and other cell configures a PDSCH transmission in the corresponding location, and all terminal apparatuses within cell N perform the interference measurement according to IMRcellN.

TABLE 1

| Common IMR set configuration | | | | |
|---|---|---|---|---|
| Interference Assumption | Cell 1 | Cell 2 | . . . | Cell N |
| IMRcell1 | OFF | ON | . . . | ON |
| IMRcell2 | ON | OFF | . . . | ON |
| . . . | ON | ON | . . . | ON |
| IMRcellN | ON | ON | . . . | OFF |

The cooperation IMR configuration device 133 may be used for the case where a few cells are included in the cell set, and configure the IMR of each cooperation cell according to the geographic location or the reference signal reception index of each cooperation terminal apparatus within the cell set, thereby to form the cooperation IMR set including the IMR of each cooperation terminal apparatus with respect to the cooperation cell thereof, to support the cooperation terminal apparatus to perform the interference measurement of the neighboring cells thereof.

According to an embodiment of the present disclosure, the cooperation IMR configuration device 133 is configured to configure the IMR according to a possible location in which the cooperation terminal apparatus may be present within each cell of the cell set and/or the reference signal reception index, thereby to form the cooperation IMR set including all the configured IMR.

This manner of configuring all possible cooperation IMR set can largely reduce the interaction signaling between cells and the cooperation delay, thereby to improve the system performance.

According to another embodiment of the present disclosure, the cooperation IMR configuration device 133 may be configured to configure cooperation IMR for each cooperation cell with respect to each cooperation terminal apparatus within the cell set according to the requirement of the cooperation terminal apparatus.

According to the present disclosure, the cooperation IMR configuration device 133 is used to configure, when a measurement set of the cooperation terminal apparatus includes plural cells, the cooperation IMR set of the cooperation terminal apparatus, such that the cooperation terminal apparatus can measure an IMR configuration set corresponding to the case where the cells in the measurement set have difference interference to the cooperation terminal apparatus, to determine the set including the configured IMR as the cooperation IMR set of the cooperation terminal apparatus.

According to an embodiment of the present disclosure, the cooperation IMR configuration device 133 is used to configure, when the measurement set of the cooperation terminal apparatus includes two cells, the cooperation IMR set of the cooperation terminal apparatus to include the IMR configuration such that the cooperation cell of the cooperation terminal apparatus has no measurement interference to the terminal apparatus in the location in which the serving cell configures the IMR.

For example, the measurement set of the cooperation terminal apparatus includes a cell 1 and a cell 2, wherein the cell 1 is the serving cell of the cooperation terminal apparatus, $I_0$ represents interference to the cooperation terminal apparatus from outside of the measurement set, and $I_1$ and $I_2$ represent interference from the cell 1 and cell 2 respectively. Table 2 shows all possible IMR configurations when the measurement set includes the two cells.

TABLE 2

| All possible IMR configurations when the measurement set includes two cells | | | |
|---|---|---|---|
| Interference Assumption | Cell 1 | Cell 2 | Interference Analysis |
| IMR1 | OFF | ON | $I_0 + I_2$ |
| IMR2 | OFF | OFF | $I_0$ |
| IMR3 | ON | OFF | $I_0 + I_1$ |
| IMR4 | ON | ON | $I_0 + I_1 + I_2$ |

As shown in Table 2, IMR1 is identical with a cell common IMR configuration, and IMR4 indicates that each cell in the measurement set has interference to the terminal apparatus in the location in which the IMR is configured and this case is impossible. In this case, the cooperation IMR configuration device 133 may configure the cooperation IMR of the cooperation terminal apparatus as {IMR2, IMR3}, that is, the IMR configuration such that the cooperation cell of the cooperation terminal apparatus has no measurement interference to the terminal apparatus in the location in which the serving cell configures the IMR.

Preferably, the interference I1 from the cell 1 may be replaced with a reception signal estimated with respect to cell 1, and thus the interference on IMR3 may be obtained through IMR2 and the estimated reception signal of the cell 1. Therefore, the cooperation IMR configuration device 133 may configure the cooperation IMR of the cooperation terminal apparatus as {IMR2}, that is, the IMR configuration such that the cell of the measurement set has no measurement interference to the terminal apparatus in the location in which the serving cell configures the IMR.

According to an embodiment of the present disclosure, in the case where the measurement set of the cooperation terminal apparatus includes three cells, the cooperation IMR configuration device 133 configures the cooperation IMR set of the cooperation terminal apparatus to include the IMR configuration such that the cooperation cell and the serving cell of the cooperation terminal apparatus has no measurement interference to the terminal apparatus in the location in which the serving cell configures the IMR.

For example, the measurement set of the cooperation terminal apparatus includes a cell 1, a cell 2, and a cell 3, wherein the cell 1 is the serving cell of the cooperation terminal apparatus, $I_0$ represents interference to the cooperation terminal apparatus from outside of the measurement set, and $I_1$, $I_2$, and $I_3$ represent interference from the cell 1, cell 2, and cell 3 respectively. Table 3 shows all possible IMR configurations when the measurement set includes the three cells.

TABLE 3

All possible IMR configurations when the measurement set includes three cells

| Interference Assumption | Cell 1 | Cell 2 | Cell 3 | Interference Analysis |
|---|---|---|---|---|
| IMR1 | OFF | ON | ON | $I_0 + I_2 + I_3$ |
| IMR2 | OFF | OFF | OFF | $I_0$ |
| IMR3 | OFF | OFF | ON | $I_0 + I_3$ |
| IMR4 | OFF | ON | OFF | $I_0 + I_2$ |
| IMR5 | ON | OFF | ON | $I_0 + I_1 + I_3$ |
| IMR6 | ON | ON | OFF | $I_0 + I_1 + I_2$ |
| IMR7 | ON | OFF | OFF | $I_0 + I_1$ |
| IMR8 | ON | ON | ON | $I_0 + I_1 + I_2 + I_3$ |

As shown in Table 3, IMR1 is identical with a cell common IMR configuration; IMR8 indicates that each cell in the measurement set has interference to the terminal apparatus in the location in which the IMR is configured and this case is impossible; and IMR7 indicates that the cooperation cell has no interference to the terminal apparatus and the serving cell has interference to the terminal apparatus in the location in which the IMR is configured, the possibility that this case occurs is very low and thus it can be ignored. Accordingly, the cooperation IMR configuration device 133 may configure the cooperation IMR of the cooperation terminal apparatus as {IMR2, IMR3, IMR4, IMR5, IMR6}. In this way, six IMRs are required for the cooperation terminal apparatus, and the IMR overhead is too large, which far exceeds the specification that at most three IMRs are configured for one terminal apparatus in 3GPP Rel-11.

To this end, the present disclosure provides a simplified scheme of IMR configuration. Specifically, the $I_1$ is replaced with the reception signal estimated by the cell 1, and the interference on IMR4 to IMR6 may be estimated through the $I_0$, $I_1$, $I_2$, $I_3$ obtained by IMR1, IMR2, IMR3 and the estimation signal of the cell 1, such that the cooperation IMR configuration device 133 may configure the cooperation IMR of the cooperation terminal apparatus as {IMR2, IMR3}. Similarly, the interference on other IMR may be estimated by IMR1, IMR2, IMR4 and the estimation signal of the cell 1, and therefore the cooperation IMR configuration device 133 may configure the cooperation IMR of the cooperation terminal apparatus as {IMR2, IMR4}.

According to an embodiment of the present disclosure, the cooperation IMR configuration device 133 is further configured to, according to the reception power or the CSI-RS and IMR overhead of the cooperation terminal apparatus with respect to each cell in the measurement set, select at least one of the IMR configurations such that at least one cooperation cell in the measurement set has no measurement interference to the terminal apparatus in the location in which the serving cell configures the IMR for the cooperation IMR set of the cooperation terminal apparatus.

Specifically, the cooperation IMR configuration device 133 is configured to, among the IMR configurations such that at least one cooperation cell in the measurement set has no measurement interference to the terminal apparatus in the location in which the serving cell configures the IMR, select the IMR configuration such that the cooperation cell with a low CSI-RS and IMR overhead or a high reception power has no measurement interference to the terminal apparatus for the cooperation IMR set of the cooperation terminal apparatus.

For example, in the case where the measurement set includes three cells, when the cooperation IMR configuration device 133 may configure the cooperation IMR of the cooperation terminal apparatus as {IMR2, IMR4} or {IMR2, IMR3}, the cooperation IMR configuration device 133 may further select an existing cell with a low CSI-RS and IMR overhead as the OFF state according to the CSI-RS and IMR overhead of existing cells. For example, when the CSI-RS and IMR overhead of the cell 2 is lower than that of the cell 3, the cooperation IMR configuration device 133 may configure the cooperation IMR of the cooperation terminal apparatus as {IMR2, IMR3}.

In addition, the cooperation IMR configuration device 133 may also determine the cooperation IMR configuration of the cooperation terminal apparatus according to the reference signal reception index of the terminal apparatus such as the magnitude of the RSRP. For example, it selects an existing cell with a high RSRP as the OFF state. For example, in the example shown in Table 3, when the cooperation terminal apparatus receives the RERP of the cell 2 that is greater than the RERP of the cell 3, {IMR2, IMR3} is selected, otherwise, {IMR2, IMR4} is selected.

According to an embodiment of the present disclosure, in the case where the measurement set of the cooperation terminal apparatus includes three cells, the cooperation IMR configuration device 133 is further configured to, when the reference signal reception index of the cooperation terminal apparatus with respect to at least one cooperation cell of the three cells, select only the IMR configuration such that the two cooperation cells have no measurement interference to the terminal apparatus in the location in which the serving cell configures the IMR, as the cooperation IMR set of the terminal apparatus.

Still taking the measurement set shown in Table 3 as an example, when the terminal apparatus receives the RERP of the cell 2 or 3 that is greater than a predetermined threshold, for example, the RERP of the cell 2 that is greater than the predetermined threshold, the $I_2$ may be replaced with the reception signal from the cell 2 that is estimated by the terminal apparatus, and the interference on IMR3 to IMR6 may be estimated through the $I_3$ obtained by IMR1, IMR2 and the estimation signal of the cell 1 and 2, such that the cooperation IMR configuration device 133 may configure the cooperation IMR set of the cooperation terminal apparatus as {IMR2}.

According to the present disclosure, the cooperation IMR configuration device 133 is further configured to configure the same cooperation IMR set for more than two cooperation terminal apparatuses that satisfy the following condition: the cooperation terminal apparatuses have the same measurement set, and a physical distance between the cooperation terminal apparatuses is within a predetermined distance threshold or a difference between the reference signal reception indexes of the cooperation terminal apparatuses with respect to the cell in the measurement set is within a predetermined distance threshold.

According to an embodiment of the present disclosure, the cooperation IMR configuration device 133 may be configured to, for the cooperation terminal apparatuses of different cells having the same measurement set, use the same IMR configuration for measuring the interference outside of the measurement set (for example, the IMR2 configuration in Tables 3 and 4) to measure the interference outside of the measurement set.

According to an embodiment of the present disclosure, when a measurement set 1 of a cooperation terminal apparatus UE1 in a cell is contained in a measurement set 2 of one or more other cooperation terminal apparatuses UE2 in the cell, the cooperation IMR configuration device 133 may configure the measurement set 2 of the other cooperation terminal apparatus UE2 and corresponding cooperation IMR set for the cooperation terminal apparatus UE1, thereby to reduce the IMR overhead.

Figure 14:
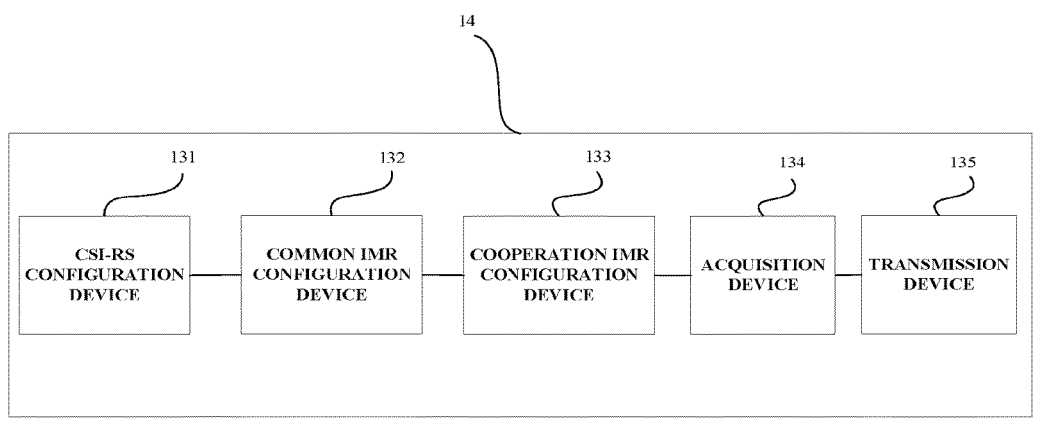
FIG. 14 is a block diagram illustrating another exemplary structure of the communication management apparatus according to the another embodiment of the present disclosure.

FIG. 14 is a block diagram illustrating another exemplary structure of the communication management apparatus according to the another embodiment of the present disclosure.

Except for the CSI-RS configuration device 131, the common IMR configuration device 132, and the cooperation IMR configuration device 133 as those included in the communication management apparatus 13 of FIG. 13, the communication management apparatus includes: an acquisition device 134 for acquiring the CSI-RS configuration and the IMR configuration of each cell in the CSI-RS set and the common IMR set when the terminal apparatus within the cell of the cell set is the non-cooperation terminal apparatus, and acquiring the CSI-RS configuration of each cell in the CSI-RS configuration set and acquiring the IMR configuration of each cell in the common IMR set and the cooperation IMR configuration set when the terminal apparatus within the cell of the cell set is the cooperation terminal apparatus; and a transmission device 135 for transmitting the acquired CSI-RS configuration and IMR configuration to the non-cooperation terminal apparatus and the cooperation terminal apparatus such that it performs the interference measurement according to the IMR configuration and calculates the CQI in combination with the signal of the CSI-RS configuration estimation.

It is possible to determine whether or not to provide the cooperation service to each terminal apparatus according to, for example, the location information, the reference signal reception index, or the terminal apparatus requirement of the terminal apparatus. Then according to whether or not to provide the cooperation service to the terminal apparatus, the acquisition device 134 selects appropriate CSI-RS configuration and IMR configuration for the terminal apparatus, and the transmission device 135 transmits the acquired CSI-RS configuration and IMR configuration to each terminal apparatus, such that the terminal apparatus performs the interference measurement in the corresponding location and calculates the CQI in combination with the signal of the CSI-RS estimation, until the terminal apparatus receives new CSI configuration and IMR configuration.

When the communication management apparatus 14 determines that there needs to provide the cooperation service to the terminal apparatus according to, for example, the location information, the reference signal reception index, or the terminal apparatus requirement of the terminal apparatus (that is, the terminal apparatus is the cooperation terminal apparatus), the transmission device 135 transmits cooperation IMR configuration information to the cooperation terminal apparatus by RRC signaling or downlink control information according to the relationship between the location information or the reference signal reception index of the terminal apparatus and the IMR, such that the cooperation terminal apparatus performs the measurement on the IMR. In addition, the cooperation IMR configuration device 133 may configure the aperiodical CSI report for the terminal apparatus, such that the terminal apparatus in the predetermined cell queries the corresponding CSI-RS and IMR configuration locally and performs the measurement report. According to another embodiment of the present disclosure, the transmission device 135 is further configured to transmit the common CSI-RS configuration set and the common IMR configuration set to the non-cooperation terminal apparatus and cooperation terminal apparatus, such that the non-cooperation terminal apparatus and cooperation terminal apparatus store them, and when moving within the cell set, query the stored common CSI-RS configuration set and common IMR configuration set to obtain the CSI-RS configuration and IMR configuration of a new cell so as to perform the interference measurement according to the obtained IMR configuration and calculate the CQI in combination with the updated signal of the CSI-RS configuration estimation.

According to an embodiment of the present disclosure, the transmission device 135 may transmit information about the CSI-RS set and the common IMR configuration set to each terminal apparatus within the cell set by paging, broadcasting, or RRC signaling, such that the terminal apparatus stores the information locally after receiving it. When the terminal apparatus moves within the cell set, there is no need to transmit the CSI-RS and IMR configuration of the new cell to the terminal apparatus, and the terminal apparatus may query a mapping relation table (as shown in Table 4) of the CSI-RS set and the common IMR configuration set to a number of the cell set and a cell identifier that is stored locally, to obtain the corresponding CSI-RS and IMR configuration and perform the measurement report.

TABLE 4

Mapping relationship table of CSI-RS and IMR configuration

| Number of Cell Set | CSI-RS Configuration | Common IMR Configuration | Cell ID |
| --- | --- | --- | --- |

According to an embodiment of the present disclosure, the CSI-RS configuration device 131 is configured to, when a new cell is switched on in the cell set, add the CSI-RS configuration of the new cell to the common CSI-RS configuration set, and when a cell is switched off in the cell set, deletes the CSI-RS configuration of the switched off cell from the common CSI-RS configuration set; the common IMR configuration device 132 is configured to, when a new cell is switched on in the cell set, add the IMR configuration of the new cell to the common IMR configuration set, and when a cell is switched off in the cell set, deletes the IMR configuration of the switched off cell from the common IMR configuration set; and the transmission device 135 is further configured to transmit the common CSI-RS configuration set and the common IMR configuration set which the have been subjected to the deletion or the addition to the non-cooperation terminal apparatus and cooperation terminal apparatus, to update the common CSI-RS configuration set and the common IMR configuration set stored therein. For example, the transmission device 135 may transmit the common CSI-RS configuration set and the common IMR configuration set which the have been subjected to the deletion or the addition to the terminal apparatus within the cell set by broadcasting or RRC signaling such that each terminal apparatus automatically updates the mapping relationship table of the CSI-RS and IMR configuration stored therein.

By querying the CSI-RS configuration and IMR configuration stored locally or receiving the CSI-RS configuration and IMR configuration transmitted from the communication management apparatus, the terminal apparatus may perform the interference measurement according to the IMR configuration and calculate the CQI in combination with the signal of the CSI-RS configuration estimation.

According to an embodiment of the present disclosure, the communication management apparatuses 13 and 14 may also configure N bits for indicating different cooperation schemes, and transmit the information indicating the different cooperation schemes to the terminal apparatus by broadcasting, paging or RRC signaling. The terminal apparatus calculates all possible CQIs according to the CSI-RS and IMR configuration selected by the above operation, selects an optimized CQI to report, and reports the cooperation scheme corresponding to the CQI through the N bits indication.

It is possible to reduce CQI feedback of the terminal apparatus and save uplink control channel resource by performing the CQI report in the above manner.

Respective component units, subunits in the above mentioned communication management apparatus according to the embodiments of the present disclosure can be configured by way of software, firmware, hardware, or any of combinations thereof. In the case of software or firmware implementation, programs constituting the software or firmware are installed to a machine with a dedicated hardware structure from a storage medium or a network, wherein the machine can execute various corresponding functions of the component units, subunits when being installed various programs.

Figure 15:
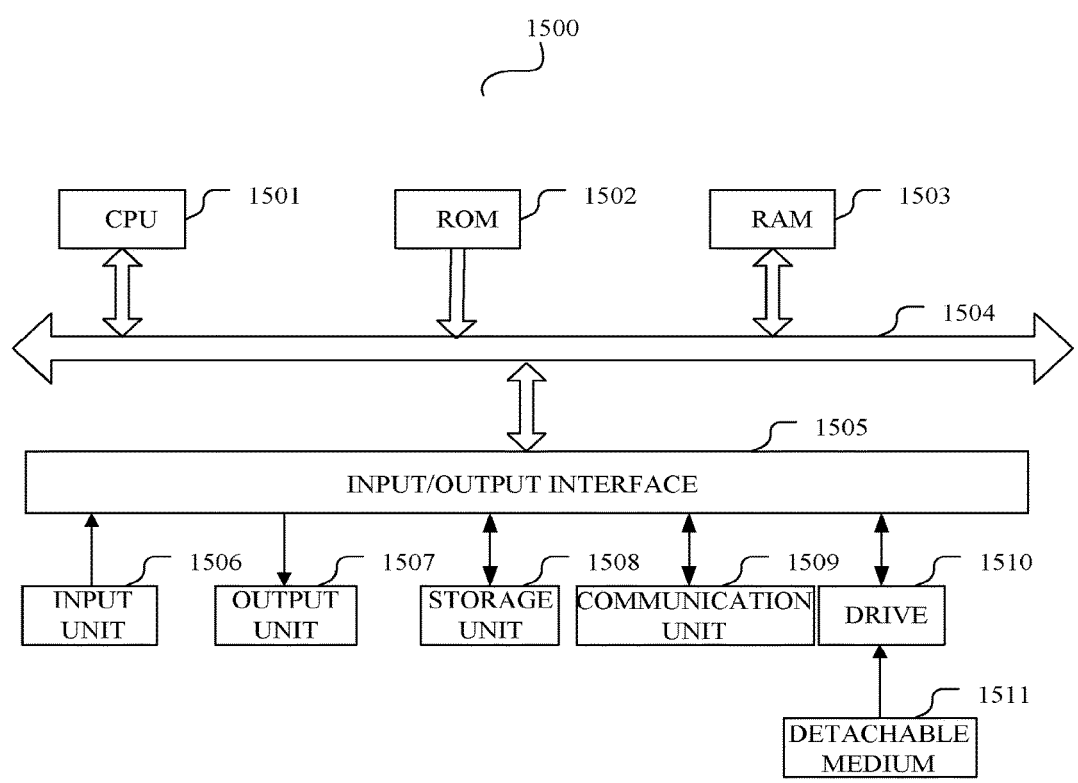
FIG. 15 is a structure schematic diagram illustrating a possible hardware configuration of the communication management apparatus according to the embodiments of the present disclosure.

FIG. 15 is a structure schematic diagram illustrating a possible hardware configuration of the communication management apparatus according to the embodiments of the present disclosure.

In FIG. 15, a central processing unit (CPU) 1501 perform various processes according to programs stored in a Read-Only Memory (ROM) 1502 or programs loaded from a storage unit 1508 to a Random Access Memory (RAM) 1503. According to requirement, the RAM 1503 also stores data required when the CPU 1501 performs various processes. The CPU 1501, ROM 1502 and RAM 1503 are connected from one to another via a bus 1504. An input/output interface 1505 is also connected to the bus 1504.

The following components are connected to the input/output interface 1505: an input unit 1506 (including a keyboard, a mouse, etc.); an output unit 1507 (including a display, such as a cathode ray tube (CRT) display, a liquid crystal display (LCD), etc., and a speakers and so on); a storage unit 1508 (including a hard disc, etc.); and a communication unit 1509 (including a network interface card such as a LAN card, a modem and so on). The communication unit 1509 performs a communication process via a network like the Internet. According to requirement, a drive 1510 may also be connected to the input/output interface 1505. A detachable medium 1511 such as a disc, a CD, a magneto-optical disc, a semiconductor memory, and so on is installed on the drive 1510 based on requirement, such that computer programs read out therefrom are installed in the storage unit 1508 based on requirement.

In case of implementing the above processes by software, programs constituting the software are installed from a network like the Internet or from a storage medium like the detachable medium 1511.

Those skilled in the art should be understood that such storage medium is not limited to the detachable medium 1511 which is stored with programs and distributes separately from the apparatus to provide a user with the programs as illustrated in FIG. 15. An example of the detachable medium 1511 includes a disc (including a Floppy Disc (Registered Trademark)), a CD (including a CD read only memory (CD-ROM) and a digital versatile disc (DVD)), a magneto-optical disc (including a mini-disc (MD) (Registered Trademark)) and a semiconductor memory. Alternatively, the storage medium may be the ROM 1502, or a hard disc included in the storage unit 1508 in which a program is stored and the program is distributed to a user with the apparatus including the same.

The present disclosure also provides a program product storing machine readable instruction code. When read and executed by a machine, the instruction code may implement the communication management method according to the embodiments of the present disclosure. Correspondingly, various storage mediums for carrying the program product such as a magnetic disk, an optical disk, a magneto-optical disk, a semiconductor memory, etc. are also included in the present disclosure.

In the above description of the specific embodiments of the present disclosure, features that are described and/or illustrated with respect to one implementation may be used in a same or similar way in one or more other implementations and/or in combination with or instead of features of other implementations.

Furthermore, the method according to the embodiments of the present disclosure shall not be limited to being performed only in the chronological sequence described in the specification or drawings, but can also be performed in another chronological sequence, concurrently or separately. Therefore, the technical scope of the present disclosure will not be limited by the sequence in which the method is performed as described in the specification.

Additionally, it is obvious that each operational process of the aforementioned method according to the present disclosure can also be realized in the form of a computer-executable program stored in various machine-readable storage media.

In addition, the objects of the present invention can also be achieved by the following way: directly or indirectly supplying the storage medium storing the aforementioned executable program code to a system or apparatus, reading and executing the program code by a computer or a central processing unit (CPU) in the system or apparatus.

In this case, as long as the system or the apparatus possesses the function to execute programs, embodiments of the present disclosure are not restricted to the program, and the program may also assume any form, such as target program, interpreter-executed program, or script program supplied to an operating system, etc.

The aforementioned machine-readable storage media include, but are not limited to, various memories and storage units, semiconductor apparatuses, magnetic units such as optical, magnetic and magneto-optical disks, as well as other media adapted to storing information.

Additionally, it is possible for the technology of the technology of the present specification to have configurations such as those below.

(1) A communication management apparatus, comprising:
a reception index determination device, configured to determine, with respect to respective neighboring cells of a serving cell of each terminal apparatus within a predetermined cell, a reference signal reception index for the terminal apparatus according to location information of the terminal apparatus, the reference signal reception index being used for indicating signal reception situation of the terminal apparatus with respect to the neighboring cells.

(2) The communication management apparatus according to (1), wherein, the reference signal reception index of the terminal apparatus includes Reference Signal Reception Power (RSRP) and/or Reference Signal Reception Quality (RSRQ).

(3) The communication management apparatus according to (2), wherein, the reception index determination device comprises an estimation unit configured to estimate, with respect to respective neighboring cells, the reference signal reception index for the terminal apparatus according to the location information of the terminal apparatus, so as to determine the reference signal reception index.

(4) The communication management apparatus according to any one of (1) to (3), further comprising a location information acquisition device configured to perform configuration with respect to the terminal apparatus, such that the terminal apparatus transmits the location information thereof to the communication management apparatus periodically or aperiodically, so as to acquire the location information of the terminal apparatus.

(5) The communication management apparatus according to any one of (1) to (4), further comprising a selection device configured to select, when a switching state conversion is to be performed in the predetermined cell, a target serving cell for the terminal apparatus before the switching state conversion is performed in the predetermined cell according to the reference signal reception index of the terminal apparatus, as the serving cell after the switching state conversion is performed in the predetermined cell.

(6) The communication management apparatus according to (5), wherein, the selection device is further configured to transmit information about a carrier and an identifier of the target serving cell to the terminal apparatus, so as to simplify a cell selection operation performed on the carrier by the terminal apparatus.

(7) The communication management apparatus according to (5) or (6), wherein, the selection device is configured to select, when an ON state is to be converted to an OFF state in the predetermined cell, an underloading cell of a cell corresponding to the highest reference signal reception index of the terminal apparatus or a cell having the reference signal reception index greater than a reception index threshold within the neighboring cells of the predetermined cell as the target serving cell of the terminal apparatus before the switching state conversion is performed in the predetermined cell.

(8) The communication management apparatus according to (7), wherein, the selection device is further configured to transmit the identifier, an OFF time, a Channel State Information Reference Symbol and an Interference Measure Resource configuration of the predetermined cell to the target serving cell and a cooperation cell that provides service to a cooperation terminal apparatus within the predetermined cell, and transmit apparatus information of the terminal apparatus to the target serving cell.

(9) The communication management apparatus according to any one of (5) to (8), wherein, the selection device is configured to select, when the OFF state is to be converted to the ON state in the predetermined cell, the predetermined cell as the target serving cell for the terminal apparatus that satisfies a first predetermined condition within the predetermined cell before the switching state conversion is performed in the predetermined cell, wherein, according to the first predetermined condition, the reference signal reception index of the terminal apparatus with respect to the serving cell thereof is less than a second threshold, and the reference signal reception index of the terminal apparatus with respect to the predetermined cell is greater than a third threshold, or the difference between the reference signal reception index of the terminal apparatus with respect to the predetermined cell and the reference signal reception index of the terminal apparatus with respect to the serving cell thereof is greater than a forth threshold.

(10) The communication management apparatus according to (9), wherein, the selection device is further configured to transmit the identifier and an ON time of the predetermined cell in which the OFF state is to be converted to the ON state to a current serving cell of the terminal apparatus.

(11) The communication management apparatus according to any one of (1) to (10), further comprising a configuration device configured to update configuration of a Channel State Indication Reference Signal (CSI-RS) and an Interference Measure Resource (IMR) of the predetermined cell according to the switching state conversion of the predetermined cell in which the switching state conversion is to be performed, such that respective terminal apparatuses within the predetermined cell perform a reference signal estimation and measure interference with the updated CSI-RS and IMR configuration.

(12) The communication management apparatus according to (11), wherein, the configuration device is further configured to update a measurement set of respective terminal apparatuses within the predetermined cell according to the switching state conversion of the predetermined cell in which the switching state conversion is to be performed.

(13) The communication management apparatus according to (11) or (12), further comprising:
a cooperation terminal apparatus determination device, configured to determine, with respect to the terminal apparatus within the predetermined cell in which the switching state conversion is to be performed, whether or not the terminal apparatus is the cooperation terminal apparatus that needs a cell cooperation according to the reference signal reception index of the terminal apparatus with respect to the predetermined cell and each cell of the neighboring cells and the reference signal reception index of the terminal apparatus with respect to the serving cell thereof;

wherein, the configuration device is further configured to update, with respect to the cooperation terminal apparatus within the predetermined cell in which the switching state conversion is to be performed, the CSI-RS and IMR configuration of the predetermined cell and configure an aperiodical CSI request for all terminal apparatuses within the predetermined cell and the neighboring cells thereof.

(14) The communication management apparatus according to any one of (1) to (13), further comprising a switching decision device configured to perform a decision of the switching state conversion of the predetermined cell based on the reference signal reception index determined by the reception index determination device.

(15) The communication management apparatus according to (14), wherein, the switching decision device is further configured to:

when the predetermined cell is in the OFF state, decide that the predetermined cell is to be the ON state if a number of the terminal apparatuses that satisfy the first predetermined condition within the predetermined cell; and when the predetermined cell is in the ON state, decide that the predetermined cell is to be the OFF state if all terminal apparatuses that take the predetermined cell as the serving cell satisfy a second predetermined condition, wherein, the second predetermined condition is that the reference signal reception index of the terminal apparatus with respect to at least one cell outside the predetermined cell is greater than a fifth threshold.

(16) The communication management apparatus according to (4), wherein, the configuration device is further configured to configure the predetermined cell to perform the switching state conversion periodically, the location information acquiring device is configured to perform configuration to the terminal apparatus, such that the terminal apparatus transmits the location information thereof to the communication management apparatus periodically according to the ON time and OFF time of the predetermined cell.

(17) The communication management apparatus according to (16), wherein, the configuration device comprises a periodical configuration unit configured to perform, with respect to the cooperation terminal apparatus within the predetermined cell in which the switching state conversion is to be performed, periodical configuration to the CSI-RS and IMR of the predetermined cell, the periodical configuration unit comprising:

a first configuration subunit configured to configure a first periodical CSI-RS and IMR set including the CSI-RS and IMR configuration that is required by all possible accessed terminal apparatuses within the predetermined cell; and a configuration determination subunit configured to determine the CSI-RS and IMR configuration that is to be measured by the cooperation terminal apparatus in the first periodical CSI-RS and IMR set according to the location information or the reference signal reception index of the cooperation terminal apparatus of the predetermined cell.

(18) The communication management apparatus according to (16) or (17), wherein, the configuration device comprises a triggered configuration unit configured to perform, with respect to the cooperation terminal apparatus within the predetermined cell in which the switching state conversion is to be performed, a triggered configuration to the CSI-RS and IMR of the predetermined cell, the triggered configuration unit comprising:

a second configuration subunit configured to configure a second periodical CSI-RS and IMR set including the CSI-RS and IMR configuration that is required by all non-cooperation terminal apparatuses within the predetermined cell; and a third configuration subunit configured to configure, based on the switching state conversion of the predetermined cell, the CSI-RS and IMR for the cooperation terminal apparatus according to the location information or the reference signal reception index of the cooperation terminal apparatus of the predetermined cell.

(19) A communication management method comprising:

determining, with respect to respective neighboring cells of a serving cell of each terminal apparatus within a predetermined cell, a reference signal reception index for the terminal apparatus according to location information of the terminal apparatus, the reference signal reception index being used for indicating signal reception situation of the terminal apparatus with respect to the neighboring cells; and performing a decision of switching of the predetermined cell according to the reference signal reception index of the terminal apparatus, and when the switching state conversion is to be performed in the predetermined cell, selecting a target serving cell for the terminal apparatus within the predetermined cell and/or configuring a Channel State Indication Reference Signal (CSI-RS) and an Interference Measure Resource (IMR) for the predetermined cell and the neighboring cells thereof.

(20) A non-transitory computer readable storage device having instructions stored therein that when executed by processing circuitry perform a communication management method, the method comprising:

determining, with respect to respective neighboring cells of a serving cell of each terminal apparatus within a predetermined cell, a reference signal reception index for the terminal apparatus according to location information of the terminal apparatus, the reference signal reception index being used for indicating signal reception situation of the terminal apparatus with respect to the neighboring cells; and performing a decision of switching of the predetermined cell according to the reference signal reception index of the terminal apparatus, and when the switching state conversion is to be performed in the predetermined cell, selecting a target serving cell for the terminal apparatus within the predetermined cell and/or configuring a Channel State Indication Reference Signal (CSI-RS) and an Interference Measure Resource (IMR) for the predetermined cell and the neighboring cells thereof.

Finally, as should be further explained, such relational terms as left and right, first and second, etc., when used in the present disclosure, are merely used to differentiate one entity or operation from another entity or operation, without necessarily requiring or suggesting that these entities or operations have therebetween any such actual relation or sequence. Moreover, terms 'comprise', 'include' or any variants thereof are meant to cover nonexclusive inclusion, so that processes, methods, objects or devices that include a series of elements not only include these elements, but also include other elements not explicitly listed, or further include elements inherent in the processes, methods, objects or devices. Without more restrictions, an element defined by the sentence 'including a . . . ' does not preclude the further inclusion of other identical elements in the processes, methods, objects or devices that include this element.

Although the present disclosure has been disclosed above by the description of specific embodiments of the present disclosure, it will be appreciated that those skilled in the art can design various modifications, improvements and equivalents of the present disclosure within the spirit and scope of appended claims. Such modifications, improvements and equivalents should also be regarded as being covered by the protection scope of the present disclosure.

The invention claimed is:

1. A communication management apparatus, comprising:
   a reception index determination device, configured to determine, with respect to respective neighboring cells of a serving cell of each terminal apparatus within a predetermined cell, a reference signal reception index for the terminal apparatus, the reference signal reception index being used for indicating signal reception situation of the terminal apparatus with respect to the neighboring cells; and
   a selection device configured to select, when a switching state conversion is to be performed in the predetermined cell, a target serving cell for the terminal apparatus before the switching state conversion is performed in the predetermined cell according to the reference signal reception index of the terminal apparatus, as the serving cell after the switching state conversion is performed in the predetermined cell.

2. The communication management apparatus according to claim 1, wherein, the reference signal reception index of the terminal apparatus includes Reference Signal Reception Power (RSRP) and/or Reference Signal Reception Quality (RSRQ).

3. The communication management apparatus according to claim 2, wherein, the reception index determination device comprises an estimation unit configured to estimate, with respect to respective neighboring cells, the reference signal reception index for the terminal apparatus according to the location information of the terminal apparatus, so as to determine the reference signal reception index.

4. The communication management apparatus according to claim 1, further comprising a location information acquisition device configured to perform configuration with respect to the terminal apparatus, such that the terminal apparatus transmits location information thereof to the communication management apparatus periodically or aperiodically, so as to acquire the location information of the terminal apparatus.

5. The communication management apparatus according to claim 1, wherein, the selection device is further configured to transmit information about a carrier and an identifier of the target serving cell to the terminal apparatus, so as to simplify a cell selection operation performed on the carrier by the terminal apparatus.

6. The communication management apparatus according to claim 1, wherein, the selection device is configured to select, when an ON state is to be converted to an OFF state in the predetermined cell, an underloading cell of a cell corresponding to the highest reference signal reception index of the terminal apparatus or a cell having the reference signal reception index greater than a reception index threshold within the neighboring cells of the predetermined cell as the target serving cell of the terminal apparatus before the switching state conversion is performed in the predetermined cell.

7. The communication management apparatus according to claim 6, wherein, the selection device is further configured to transmit the identifier, an OFF time, a Channel State Information Reference Symbol and an Interference Measure Resource configuration of the predetermined cell to the target serving cell and a cooperation cell that provides service to a cooperation terminal apparatus within the predetermined cell, and transmit apparatus information of the terminal apparatus to the target serving cell.

8. The communication management apparatus according to claim 1, wherein, the selection device is configured to select, when the OFF state is to be converted to the ON state in the predetermined cell, the predetermined cell as the target serving cell for the terminal apparatus that satisfies a first predetermined condition within the predetermined cell before the switching state conversion is performed in the predetermined cell,
   wherein, according to the first predetermined condition, the reference signal reception index of the terminal apparatus with respect to the serving cell thereof is less than a second threshold, and the reference signal reception index of the terminal apparatus with respect to the predetermined cell is greater than a third threshold, or the difference between the reference signal reception index of the terminal apparatus with respect to the predetermined cell and the reference signal reception index of the terminal apparatus with respect to the serving cell thereof is greater than a forth threshold.

9. The communication management apparatus according to claim 8, wherein, the selection device is further configured to transmit the identifier and an ON time of the predetermined cell in which the OFF state is to be converted to the ON state to a current serving cell of the terminal apparatus.

10. The communication management apparatus according to claim 1, further comprising a configuration device configured to update configuration of a Channel State Indication Reference Signal (CSI-RS) and an Interference Measure Resource (IMR) of the predetermined cell according to the switching state conversion of the predetermined cell in which the switching state conversion is to be performed, such that respective terminal apparatuses within the predetermined cell perform a reference signal estimation and measure interference with the updated CSI-RS and IMR configuration.

11. The communication management apparatus according to claim 10, wherein, the configuration device is further configured to update a measurement set of respective terminal apparatuses within the predetermined cell according to the switching state conversion of the predetermined cell in which the switching state conversion is to be performed.

12. The communication management apparatus according to claim 10, further comprising:
   a cooperation terminal apparatus determination device, configured to determine, with respect to the terminal apparatus within the predetermined cell in which the switching state conversion is to be performed, whether or not the terminal apparatus is the cooperation terminal apparatus that needs a cell cooperation according to the reference signal reception index of the terminal apparatus with respect to the predetermined cell and each cell of the neighboring cells and the reference signal reception index of the terminal apparatus with respect to the serving cell thereof;
   wherein, the configuration device is further configured to update, with respect to the cooperation terminal apparatus within the predetermined cell in which the switching state conversion is to be performed, the CSI-RS and IMR configuration of the predetermined cell and configure an aperiodical CSI request for all terminal apparatuses within the predetermined cell and the neighboring cells thereof.

13. The communication management apparatus according to claim 1, further comprising a switching decision device configured to perform a decision of the switching state conversion of the predetermined cell based on the reference signal reception index determined by the reception index determination device.

14. The communication management apparatus according to claim 13, wherein, the switching decision device is further configured to:
  when the predetermined cell is in the OFF state, decide that the predetermined cell is to be the ON state if a number of the terminal apparatuses that satisfy the first predetermined condition within the predetermined cell; and
  when the predetermined cell is in the ON state, decide that the predetermined cell is to be the OFF state if all terminal apparatuses that take the predetermined cell as the serving cell satisfy a second predetermined condition, wherein, the second predetermined condition is that the reference signal reception index of the terminal apparatus with respect to at least one cell outside the predetermined cell is greater than a fifth threshold.

15. The communication management apparatus according to claim 4, wherein,
  the configuration device is further configured to configure the predetermined cell to perform the switching state conversion periodically,
  the location information acquiring device is configured to perform configuration to the terminal apparatus, such that the terminal apparatus transmits the location information thereof to the communication management apparatus periodically according to the ON time and OFF time of the predetermined cell.

16. The communication management apparatus according to claim 15, wherein, the configuration device comprises a periodical configuration unit configured to perform, with respect to the cooperation terminal apparatus within the predetermined cell in which the switching state conversion is to be performed, periodical configuration to the CSI-RS and IMR of the predetermined cell, the periodical configuration unit comprising:
  a first configuration subunit configured to configure a first periodical CSI-RS and IMR set including the CSI-RS and IMR configuration that is required by all possible accessed terminal apparatuses within the predetermined cell; and
  a configuration determination subunit configured to determine the CSI-RS and IMR configuration that is to be measured by the cooperation terminal apparatus in the first periodical CSI-RS and IMR set according to the location information or the reference signal reception index of the cooperation terminal apparatus of the predetermined cell.

17. The communication management apparatus according to claim 15, wherein, the configuration device comprises a triggered configuration unit configured to perform, with respect to the cooperation terminal apparatus within the predetermined cell in which the switching state conversion is to be performed, a triggered configuration to the CSI-RS and IMR of the predetermined cell, the triggered configuration unit comprising:
  a second configuration subunit configured to configure a second periodical CSI-RS and IMR set including the CSI-RS and IMR configuration that is required by all non-cooperation terminal apparatuses within the predetermined cell; and
  a third configuration subunit configured to configure, based on the switching state conversion of the predetermined cell, the CSI-RS and IMR for the cooperation terminal apparatus according to the location information or the reference signal reception index of the cooperation terminal apparatus of the predetermined cell.

18. A communication management method comprising:
  determining, with respect to respective neighboring cells of a serving cell of each terminal apparatus within a predetermined cell, a reference signal reception index for the terminal apparatus, the reference signal reception index being used for indicating signal reception situation of the terminal apparatus with respect to the neighboring cells; and
  selecting, when a switching state conversion is to be performed in the predetermined cell, a target serving cell for the terminal apparatus before the switching state conversion is performed in the predetermined cell according to the reference signal reception index of the terminal apparatus, as the serving cell after the switching state conversion is performed in the predetermined cell.

19. A communication device comprising:
  circuitry configured to:
  measure reference signal of at least one of neighboring cells for radio measurement management when the at least one of the neighboring cells is under an OFF state;
  report reference signal reception index after the measurement to determine a switching state conversion of the at least one of the neighboring cells, wherein the reference signal reception index comprises at least one of Reference Signal Reception Power (RSRP) and Reference Signal Reception Quality (RSRQ); and
  receive transmission from serving cell of the communication device and at least one of the neighboring cells when the at least one of the neighboring cells is switched from the OFF state to an ON state.

20. The communication device of claim 19, wherein the at least one of neighboring cells only transmits reference signal when the at least one of neighboring cells is under the OFF state.

* * * * *